US011831382B2

United States Patent
Luo et al.

(10) Patent No.: US 11,831,382 B2
(45) Date of Patent: Nov. 28, 2023

(54) TECHNIQUES FOR USING SENSOR INFORMATION FOR WIRELESS COMMUNICATIONS

(71) Applicant: QUALCOMM Incorporated, San Diego, CA (US)

(72) Inventors: Tao Luo, San Diego, CA (US); Hamed Pezeshki, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/122,904

(22) Filed: Dec. 15, 2020

(65) Prior Publication Data
US 2021/0184748 A1    Jun. 17, 2021

Related U.S. Application Data

(60) Provisional application No. 62/948,790, filed on Dec. 16, 2019.

(51) Int. Cl.
*H04B 7/06* (2006.01)
*H04W 52/14* (2009.01)
(Continued)

(52) U.S. Cl.
CPC .......... *H04B 7/0695* (2013.01); *H04W 24/10* (2013.01); *H04W 36/32* (2013.01); *H04W 52/143* (2013.01); *H04W 76/11* (2018.02)

(58) Field of Classification Search
CPC .. H04B 7/0617; H04B 7/0695; H04B 7/0408; H04B 7/0608; H04B 7/024;
(Continued)

(56) References Cited

U.S. PATENT DOCUMENTS 6,349,119 B1 *   2/2002   Sogabe ............... H04B 17/391
                                              375/316
2016/0014566 A1   1/2016   Bengtsson et al.
(Continued)

FOREIGN PATENT DOCUMENTS

CN        110572854 A        12/2019
EP          2475123 A1         7/2012
(Continued)

OTHER PUBLICATIONS

Alrabeiah et al., "Millimeter Wave Base stations with Cameras: Vision Aided Beam and Blockage Prediction", arXiv, Nov. 15, 2019, 6 pages. (Year: 2019).*
(Continued)

*Primary Examiner* — Quoc Thai N Vu
(74) *Attorney, Agent, or Firm* — Holland & Hart LLP/QUALCOMM Incorporated

(57) ABSTRACT

Methods, systems, and devices for wireless communications are described. A user equipment (UE) may receive, via a sensor included within the UE, information associated with a base station. For instance, the UE may receive, via a camera included within the UE, an image of the base station. In some cases, the information associated with the base station may also include environment information identifying an antenna of the base station. The UE may then perform, based on the received information, a beam management procedure to track a UE beam corresponding to a base station beam, and communicate with the base station based on the beam management procedure.

42 Claims, 16 Drawing Sheets

(51) Int. Cl.
   *H04W 24/10* (2009.01)
   *H04W 36/32* (2009.01)
   *H04W 76/11* (2018.01)
(58) Field of Classification Search
   CPC ...... H04B 7/0814; H04B 7/088; H04B 17/17;
   H04B 17/3913; H04B 7/0404; H04W
   16/28; H04W 24/10; H04W 36/08; H04W
   36/32; H04W 72/02; H04W 52/143;
   H04W 76/11; H04W 4/023; H04W 52/42;
   H04W 88/02; G06V 20/10; G06V 10/273;
   G06V 10/42; G06V 20/176; G06V
   30/224; G06T 7/246; G06T 17/05; G06T
   2207/10016; G06T 2207/10032; G06T
   2207/10044; G06T 2207/20084; G06T
   2207/30232; G06T 7/20; G06T 7/60
   See application file for complete search history.

(56) References Cited

U.S. PATENT DOCUMENTS

| | | |
|---|---|---|
| 2018/0191422 A1 | 7/2018 | Xia et al. |
| 2018/0234137 A1 | 8/2018 | Qu et al. |
| 2018/0376275 A1* | 12/2018 | Jiang ................... H01Q 3/36 |
| 2019/0260455 A1 | 8/2019 | Ryu et al. |
| 2019/0261193 A1 | 8/2019 | Torsner et al. |
| 2019/0320336 A1* | 10/2019 | Takano ................ H04W 16/28 |

FOREIGN PATENT DOCUMENTS

| | | |
|---|---|---|
| WO | WO-2017109456 A1 | 6/2017 |
| WO | WO-2019192711 A1 | 10/2019 |
| WO | WO-2021100095 A1 * | 5/2021 |

OTHER PUBLICATIONS

Oguma et al., "Proactive Base Station Selection Based on Human Blockage Prediction Using RGB-D Cameras for mmWave Communications", IEEE Xplore, 2015, 6 pages. (Year: 2015).*

Alkhateed et al., "Machine Learning for Reliable mmWave Systems: Blockage Prediction and Proactive Handoff", IEEE Xplore, 2018, 5 pages. (Year: 2018).*

Lewis H.D., "Using Phased Array Radar for Data Communications", Proceedings of the National Aerospace and Electronics Conference, (NAECON) Dayton, May 19-21, 1981, [Proceedings of the National Aerospace and Electronics Conference, (NAECON)], New York, IEEE, US, vol. 1, May 19, 1981 (May 19, 1981), pp. 371-376, XP002142091, p. 1, col. 2.

Partial International Search Report—PCT/US2020/065255—ISA/EPO—dated Mar. 31, 2021.

International Search Report and Written Opinion—PCT/US2020/065255—ISA/EPO—dated May 14, 2021.

* cited by examiner

TECHNIQUES FOR USING SENSOR INFORMATION FOR WIRELESS COMMUNICATIONS

CROSS REFERENCE

The present application for patent claims the benefit of U.S. Provisional Patent Application No. 62/948,790 by LUO et al., entitled "TECHNIQUES FOR USING SENSOR INFORMATION FOR WIRELESS COMMUNICATIONS," filed Dec. 16, 2019, assigned to the assignee hereof, and expressly incorporated by reference herein.

INTRODUCTION

The following relates to wireless communications, and more specifically to using sensor information for communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications system, a base station and a UE may implement beamforming to initiate and continue communication.

SUMMARY

A method of wireless communication at a first communications device is described. The method may include receiving, via a sensor included within the first communications device, information associated with a second communications device. The method may further include performing, at the first communications device and based on the received information, a beam management procedure to identify at least one transmit beam or receive beam. The method may also include communicating with the second communications device based on the beam management procedure.

An apparatus for wireless communication at a UE is described. The apparatus may include a processor, and memory coupled to the processor. The processor and memory may be configured to receive, via a sensor included within the first communications device, information associated with a second communications device. The processor and memory may be configured to perform, at the first communications device and based on the received information, a beam management procedure to identify at least one transmit beam or receive beam. The processor and memory may also be configured to communicate with the second communications device based on the beam management procedure.

Another apparatus for wireless communication at a UE is described. The apparatus may include means for receiving information associated with a second communications device. The apparatus may include means for performing, at the UE and based on the received information, a beam management procedure to identify at least one transmit beam or receive beam. The apparatus may further include means for communicating with the second communications device based on the beam management procedure.

A non-transitory computer-readable medium storing code for wireless communication at a UE is described. The code may include instructions executable by a processor to receive, via a sensor included within the first communications device, information associated with a second communications device. The code also may include instructions executable by the processor to perform, at the UE and based on the received information, a beam management procedure to identify at least one transmit beam or receive beam. The code may further include instructions executable by the processor to communicate with the second communications device based on the beam management procedure.

Some examples of the method, apparatuses, and non-transitory computer-readable medium described herein may further include operations, features, means, or instructions for receiving, via a camera included within the first communications device, an image of the second communications device, and processing the image of the second communications device to identify an antenna panel of the second communications device. In some examples, the beam management procedure may be based on identifying the antenna panel of the second communications device.

In some examples of the method, apparatuses, and non-transitory computer-readable medium described herein, the performing may include operations, features, means, or instructions for predicting a potential blockage of the at least one transmit beam corresponding to the at least one receive beam based on receiving the information associated with the second communications device, and transmitting, to the second communications device, a signal indicating the potential blockage of the at least one transmit beam.

Some examples of the method, apparatuses, and non-transitory computer-readable medium described herein may further include operations, features, means, or instructions for receiving, from the second communications device, an indication to perform a beam switch procedure prior to failure of the at least one transmit beam. Some examples of the method, apparatuses, and non-transitory computer-readable medium described herein may further include operations, features, means, or instructions for performing the beam switch procedure to switch to a second transmit beam to track a second receive beam based on the received indication. In some examples of the method, apparatuses, and non-transitory computer-readable medium described herein, the at least one transmit beam may have a higher priority than the second transmit beam.

In some examples of the method, apparatuses, and non-transitory computer-readable medium described herein, the performing may include operations, features, means, or instructions for determining a first reference signal receive power associated with the at least one transmit beam and a second reference signal receive power associated with a second transmit beam. In some examples, the first reference signal receive power may be greater than the second reference signal receive power. In some examples of the method, apparatuses, and non-transitory computer-readable medium described herein, the performing may include operations, features, means, or instructions for predicting a potential blockage of the UE beam based on receiving the information associated with the second communications device, and transmitting, to the second communications device and based on predicting the potential blockage of the at least one transmit beam, a measurement report associated with the second transmit beam.

Some examples of the method, apparatuses, and non-transitory computer-readable medium described herein may further include operations, features, means, or instructions for determining that the first communications device is located on a line of sight of the second communications device based on receiving the information associated with the second communications device. Some examples of the method, apparatuses, and non-transitory computer-readable medium described herein may further include operations, features, means, or instructions for transmitting, to the second communications device, a signal indicating that the first communications device is located on the line of sight of the second communications device.

Some examples of the method, apparatuses, and non-transitory computer-readable medium described herein may further include operations, features, means, or instructions for performing, at the first communications device, a power control procedure based on determining that the first communications device may be located on the line of sight of the first communications device.

Some examples of the method, apparatuses, and non-transitory computer-readable medium described herein may further include operations, features, means, or instructions for receiving, via the sensor included within the first communications device, additional information associated with a third communications device, and performing, at the first communications device, an interference management associated with the third communications device based on receiving the information associated with the second communications device and the additional information associated with the third communications device.

Some examples of the method, apparatuses, and non-transitory computer-readable medium described herein may further include operations, features, means, or instructions for establishing an initial access of the second communications device based on receiving the information associated with the second communications device.

Some examples of the method, apparatuses, and non-transitory computer-readable medium described herein may further include operations, features, means, or instructions for receiving, via a camera included within the first communications device, an image including the second communications device and a third communications device. Some examples of the method, apparatuses, and non-transitory computer-readable medium described herein may further include operations, features, means, or instructions for determining a location of the third communications device based on the image, and performing a handover of the first communications device from the second communications device to the third communications device based on the determining the location of the third communications device.

In some examples of the method, apparatuses, and non-transitory computer-readable medium described herein, the receiving may include operations, features, means, or instructions for receiving, via a radio detection and ranging sensor included within the first communications device, a signal identifying an antenna of the second communications device. In some examples, the beam management procedure may be based on identifying the antenna.

In some examples of the method, apparatuses, and non-transitory computer-readable medium described herein, the receiving may include operations, features, means, or instructions for receiving, via a light detection and ranging sensor included within the first communications device, a signal identifying an antenna of the second communications device. In some examples, the beam management procedure may be based on identifying the antenna. In some examples of the method, apparatuses, and non-transitory computer-readable medium described herein, the information associated with the base station includes environment information identifying an antenna panel of the base station.

A method of wireless communication at a first communications device is described. The method may include receiving, via a sensor included within the UE, information associated with a base station. The method may further include performing, at the UE, a power control procedure based on the received information. The method may also include communicating with the base station based on performing the power control procedure.

An apparatus for wireless communication at a UE is described. The apparatus may include a processor, and memory coupled to the processor. The processor and memory may be configured to receive, via a sensor included within the UE, information associated with a base station. The processor and memory may be configured to perform, at the UE, a power control procedure based on the received information. The processor and memory may also be configured to communicate with the base station based on performing the power control procedure.

Another apparatus for wireless communication at a UE is described. The apparatus may include means for receiving information associated with a base station. The apparatus may include means for performing, at the UE, a power control procedure based on the received information. The apparatus may further include means for communicating with the base station based on performing the power control procedure.

A non-transitory computer-readable medium storing code for wireless communication at a UE is described. The code may include instructions executable by a processor to receive, via a sensor included within the UE, information associated with a base station. The code also may include instructions executable by the processor to perform, at the UE, a power control procedure based on the received information. The code may further include instructions executable by the processor to communicate with the base station based on performing the power control procedure.

Some examples of the method, apparatuses, and non-transitory computer-readable medium described herein may further include operations, features, means, or instructions for receiving, via a camera included within the UE, an image of the base station, and processing the image of the base station to identify an antenna panel of the base station.

Some examples of the method, apparatuses, and non-transitory computer-readable medium described herein may further include operations, features, means, or instructions for determining that the UE is located on a line of sight of the base station based on receiving the information associated with the base station, and transmitting, to the base station, a signal indicating that the UE is located on the line of sight of the base station.

Some examples of the method, apparatuses, and non-transitory computer-readable medium described herein may further include operations, features, means, or instructions for performing, at the base station, the power control procedure based on determining that the UE is located on the line of sight of the base station.

Some examples of the method, apparatuses, and non-transitory computer-readable medium described herein may further include operations, features, means, or instructions for establishing an initial access procedure at the base station based on receiving the information associated with the base station.

Some examples of the method, apparatuses, and non-transitory computer-readable medium described herein may further include operations, features, means, or instructions for receiving, via a radio detection and ranging sensor included within the UE, a signal identifying the base station. In some cases, the power control procedure is based on identifying the base station.

Some examples of the method, apparatuses, and non-transitory computer-readable medium described herein may further include operations, features, means, or instructions for receiving, via a light detection and ranging sensor included within the UE, a signal identifying the base station. In some cases, the power control procedure is based on identifying the base station.

In some examples of the method, apparatuses, and non-transitory computer-readable medium described herein, the information associated with the base station includes environment information identifying the base station.

A method of wireless communication at a first communications device is described. The method may include receiving, via a sensor included within the UE, information associated with a first base station and a second base station. The method may further include estimating a location of the second base station based on the information associated with the first base station and the second base station. The method may also include performing a handover of the UE from the first base station to the second base station based on estimating the location of the second base station.

An apparatus for wireless communication at a UE is described. The apparatus may include a processor, and memory coupled to the processor. The processor and memory may be configured to receive, via a sensor included within the UE, information associated with a first base station and a second base station. The processor and memory may be configured to estimate a location of the second base station based on the information associated with the first base station and the second base station. The processor and memory may also be configured to perform a handover of the UE from the first base station to the second base station based on estimating the location of the second base station.

Another apparatus for wireless communication at a UE is described. The apparatus may include means for receiving information associated with a first base station and a second base station. The apparatus may include means for estimating a location of the second base station based on the information associated with the first base station and the second base station. The apparatus may further include means for performing a handover of the UE from the first base station to the second base station based on estimating the location of the second base station.

A non-transitory computer-readable medium storing code for wireless communication at a UE is described. The code may include instructions executable by a processor to receive, via a sensor included within the UE, information associated with a first base station and a second base station. The code also may include instructions executable by the processor to estimate a location of the second base station based on the information associated with the first base station and the second base station. The code may further include instructions executable by the processor to perform a handover of the UE from the first base station to the second base station based on estimating the location of the second base station.

Some examples of the method, apparatuses, and non-transitory computer-readable medium described herein may further include operations, features, means, or instructions for receiving, via a camera included within the UE, an image including the first base station and the second base station. In some cases, estimating the location of the second base station is based on the image.

Some examples of the method, apparatuses, and non-transitory computer-readable medium described herein may further include operations, features, means, or instructions for communicating with the second base station based on performing the handover.

In some examples of the method, apparatuses, and non-transitory computer-readable medium described herein, the information associated with the first base station and the second base station includes environment information identifying the first base station and the second base station.

A method of wireless communication at a base station is described. The method may include receiving, via a sensor included within the base station, information associated with a UE, performing, at the base station and based on the received information, a beam management procedure to identify at least one transmit beam or receive beam, and communicating with the UE based on performing the beam management procedure.

An apparatus for wireless communication at a base station is described. The apparatus may include a processor and memory coupled with the processor. The processor and memory may be configured to receive, via a sensor included within the base station, information associated with a UE, perform, at the base station and based on the received information, a beam management procedure to identify at least one transmit beam or receive beam, and communicate with the UE based on performing the beam management procedure.

Another apparatus for wireless communication at a base station is described. The apparatus may include means for receiving information associated with a UE, performing, at the base station and based on the received information, a beam management procedure to identify at least one transmit beam or receive beam, and communicating with the UE based on performing the beam management procedure.

A non-transitory computer-readable medium storing code for wireless communication at a base station is described. The code may include instructions executable by a processor to receive, via a sensor included within the base station, information associated with a UE, perform, at the base station and based on the received information, a beam management procedure to identify at least one transmit beam or receive beam, and communicate with the UE based on performing the beam management procedure.

Some examples of the method, apparatuses, and non-transitory computer-readable medium described herein may further include operations, features, means, or instructions for receiving, via a camera included within the base station, an image of the UE, and processing the image of the UE to identify the UE, where the beam management procedure may be based on identifying the UE.

In some examples of the method, apparatuses, and non-transitory computer-readable medium described herein, performing the beam management procedure further may include operations, features, means, or instructions for predicting a potential blockage of the at least one transmit beam corresponding to the at least one receive beam based on receiving the information associated with the UE, and transmitting, to the UE and based on predicting the potential blockage, an indication to perform a beam switch procedure to switch to a second UE beam to track a second base station beam prior to failure of the base station beam.

In some examples of the method, apparatuses, and non-transitory computer-readable medium described herein, performing the beam management procedure further may include operations, features, means, or instructions for receiving, from the UE, a signal indicating a potential blockage of the UE beam, and transmitting, to the UE and based on receiving the signal, an indication to perform a beam switch procedure to switch to a second UE beam to track a second base station beam prior to failure of the UE beam. In some examples of the method, apparatuses, and non-transitory computer-readable medium described herein, the UE beam may have a higher priority than the second UE beam.

In some examples of the method, apparatuses, and non-transitory computer-readable medium described herein, performing the beam management procedure further may include operations, features, means, or instructions for receiving, from the UE and based on a potential blockage of the UE beam, a measurement report associated with a second UE beam, where the UE may be associated with a first reference signal receive power and the second UE beam may be associated with a second reference signal receive power, the first reference signal receive power being greater than the second reference signal receive power.

Some examples of the method, apparatuses, and non-transitory computer-readable medium described herein may further include operations, features, means, or instructions for receiving, from the UE, a signal indicating that the UE may be located on a line of sight of the base station, where performing the beam management procedure may be based on the signal. Some examples of the method, apparatuses, and non-transitory computer-readable medium described herein may further include operations, features, means, or instructions for establishing an initial access of the UE based on receiving the information associated with the UE.

In some examples of the method, apparatuses, and non-transitory computer-readable medium described herein, receiving the information associated with the UE further may include operations, features, means, or instructions for receiving, via a radio detection and ranging sensor included within the base station, a signal identifying the UE, where the beam management procedure may be based on identifying the UE.

In some examples of the method, apparatuses, and non-transitory computer-readable medium described herein, receiving the information associated with the UE further may include operations, features, means, or instructions for receiving, via a light detection and ranging sensor included within the base station, a signal identifying the UE, where the beam management procedure may be based on identifying the UE. In some examples of the method, apparatuses, and non-transitory computer-readable medium described herein, the information associated with the UE includes environment information identifying the UE.

DETAILED DESCRIPTION

Figure 1:
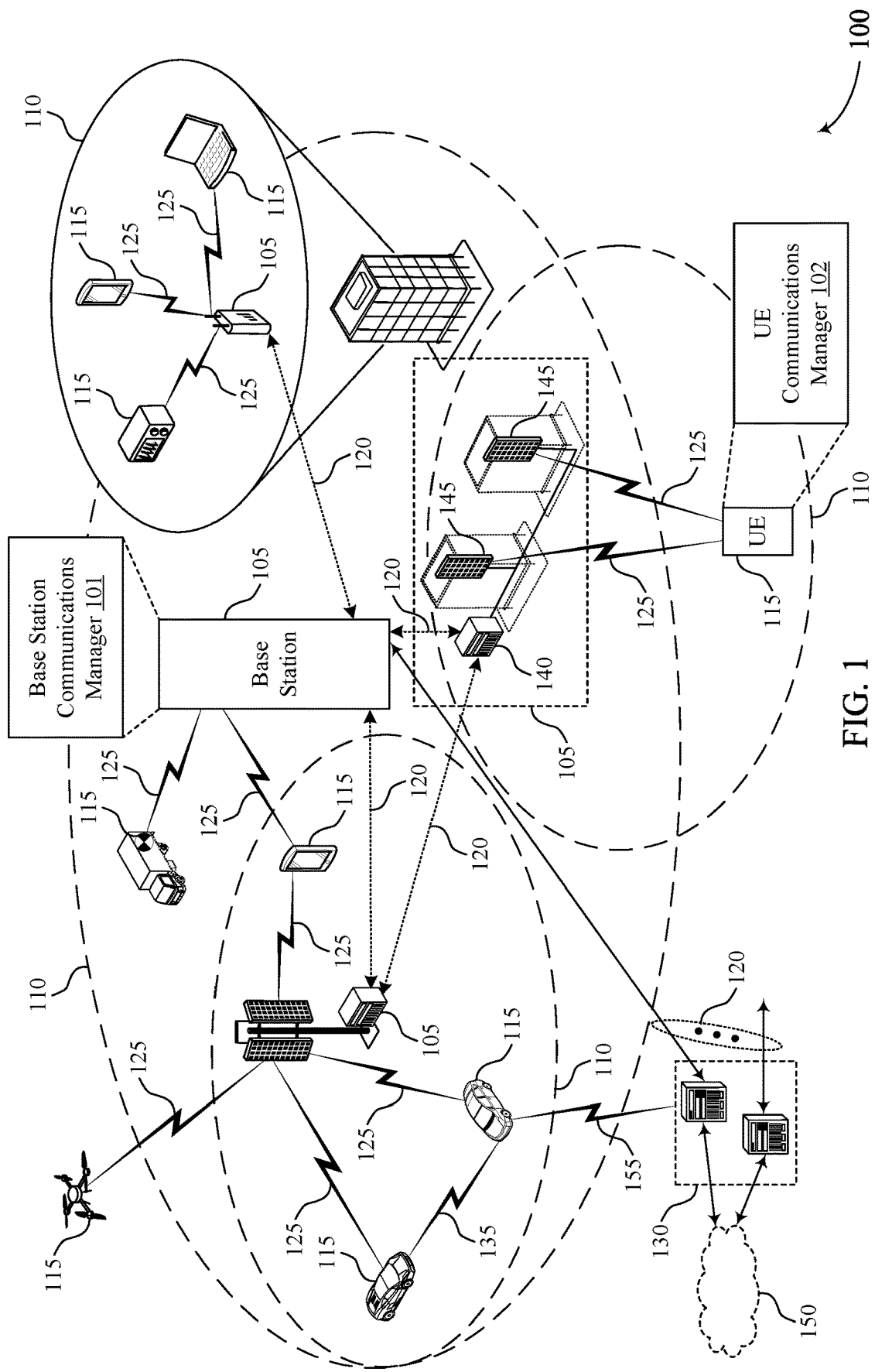
FIG. 1 illustrates an example of a wireless communications system that supports techniques for using sensor information for wireless communications in accordance with one or more aspects of the present disclosure.

A wireless communications system may support communication beams for communications between one or more communication devices. A communication beam may support a communication link between a UE and a base station. For example, a communication beam may support uplink signaling, downlink signaling, connection procedures, etc. According to some examples, a base station may be configured with multiple antennas, which may be used for directional or beamformed transmissions (e.g., beamformed communication beams). Similarly, a UE may be configured with multiple antennas, which may be used for directional or beamformed transmissions (e.g., beamformed communication beams). In some examples, the UE may perform a beam sweep procedure to establish an initial connection with the base station. The base station may then communicate with the UE on an active base station communication beam, and the UE may communicate with the base station on an active UE communication beam. However, some wireless communications systems may use information transmitted between a transmitter and a receiver to perform communications. Specifically, some wireless communications systems may perform beam management procedures using information transmitted from a UE to a base station, and vice versa.

One or more aspects of the present disclosure provide for wireless communications systems to perform beam management (such as, initial access, beam tracking, power control, and beam reporting, etc.) using sensor information. In some examples, a UE (e.g., first communications device) may receive, via a sensor included within the UE, information associated with a base station (e.g., second communications device). In some examples, the UE may include a camera, a radio detection and ranging sensor, and a light detection and ranging sensor, and the UE may receive information about a location of a base station using the sensors. Similarly, the base station may also include one or more sensors, and may receive information about a UE using the one or more sensors. According to some aspects, the UE may perform a beam management procedure to identify (e.g., track) a UE beam corresponding to a base station beam. In some examples, the beam management procedure may be based on the received information. Similarly, the base station may also perform a beam management procedure based on the information received by the sensors included within the base station. The UE and the base station may then communicate based on the beam management procedure.

Communications devices having the capability to use sensor information for wireless communications may utilize the techniques described herein to experience power saving, such as reduced power consumption and extended battery life while ensuring reliable and efficient communications between UEs and base stations. Particular aspects of the subject matter described in this disclosure may be implemented to realize one or more enhancements. The techniques employed by the described UEs may provide benefits and enhancements to the operation of the UEs. For example, operations performed by the UEs may provide improvements to wireless operations. Additionally or alternatively, the techniques employed by the described UEs may provide time and power savings. In some examples, the UEs may support high reliability and low latency communications, among other examples, in accordance with aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of a wireless communications system. Aspects of the disclosure are further illustrated by and described with reference to apparatus diagrams, system diagrams, and flowcharts that relate to techniques for using sensor information for wireless communications.

FIG. 1 illustrates an example of a wireless communications system 100 that supports techniques for using sensor information for wireless communications in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T\_s=1/((\Delta f\_max \cdot N\_f))$ seconds, where $\Delta f\_max$ may represent the maximum supported subcarrier spacing, and $N\_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N\_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting.

MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A medium access control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Some wireless communications systems support use of information transmitted between a receiver and a transmitter to perform communications. Specifically, some wireless communications systems use signals transmitted from a UE or received at the UE to perform communications. Additionally or alternatively, some wireless communications systems use signals transmitted from a base station or received at the base station to perform communications. Aspects of the present disclosure provide for wireless communications systems (such as, wireless communications system 100) to perform aspects of communications (such as, initial access, beam tracking, power control, and beam reporting) using sensor information. According to some examples, the wireless communications system 100 may support using sensor information to efficiently perform beam management procedures.

One or more of the base stations 105 may include a base station communications manager 101, which may receive, via a sensor included within the base station 105, information associated with a UE 115. The base station communications manager 101 may perform, based on the received information, a beam management procedure. In some examples, the beam management procedure may include a procedure to identify (e.g., track) a UE beam corresponding to a base station beam. The base station communications manager 101 may then communicate with the UE 115 based on performing the beam management procedure.

UEs 115 may include a UE communications manager 102, which may receive, via a sensor included within the UE 115, information associated with a base station. The UE communications manager 102 may perform, at the UE 115 and based on the received information, a beam management procedure. In some examples, the beam management procedure may include a procedure to identify (e.g., track) a UE beam corresponding to a base station beam. The UE communications manager 102 may then communicate with the base station 105 based on the beam management procedure.

Figure 2:
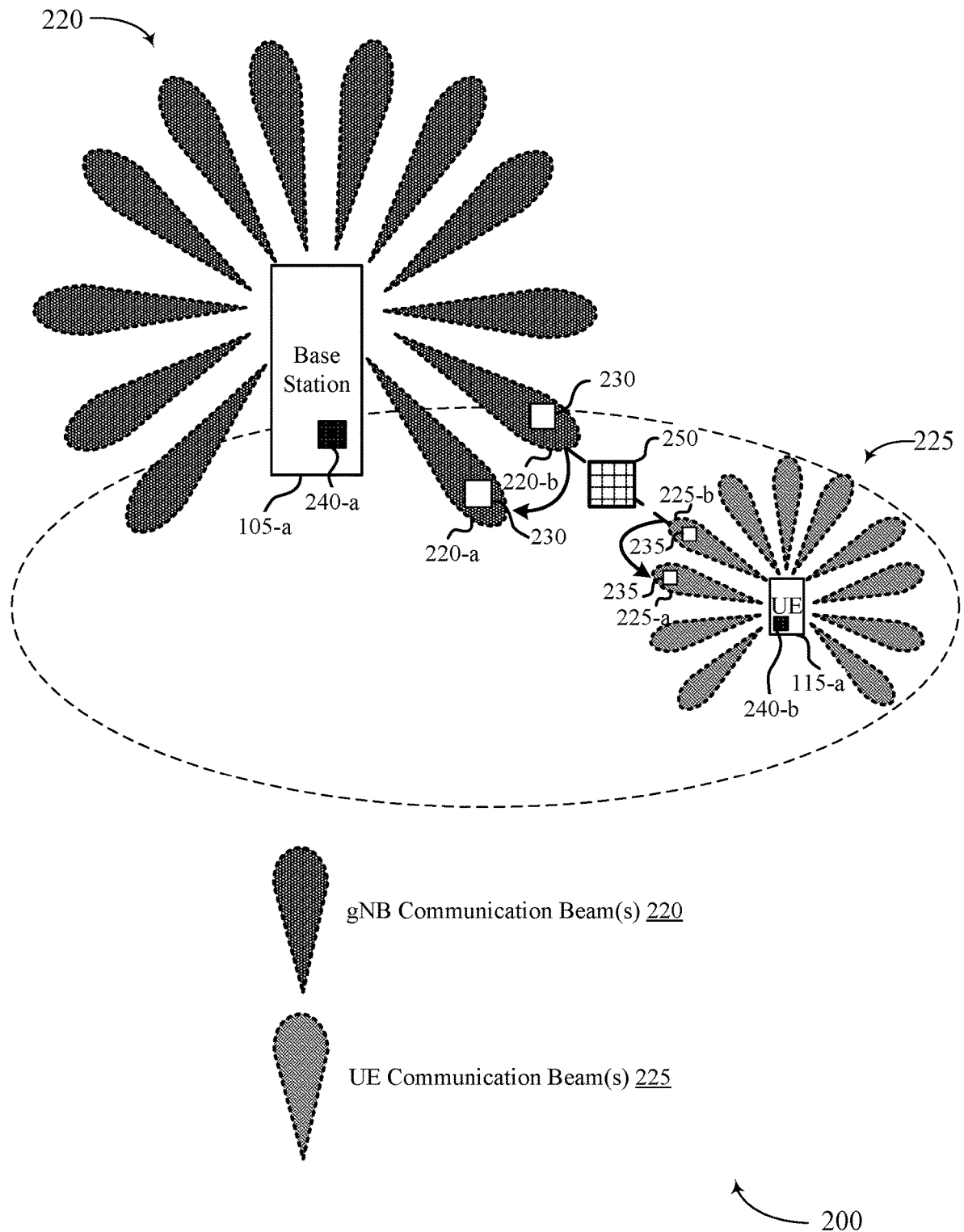
FIG. 2 illustrates an example of a wireless communications system that supports techniques for using sensor information for wireless communications in accordance with one or more aspects of the present disclosure.

FIG. 2 illustrates an example of a wireless communications system 200 that supports techniques for using sensor information for wireless communications in accordance with one or more aspects of the present disclosure. In some examples, the wireless communications system 200 may implement aspects of wireless communications system 100. The wireless communications system 200 may include a base station 105-*a* and a UE 115-*a*, which may be examples of the corresponding devices described with reference to FIG. 1. The wireless communications system 200 may support handling power control and efficiency related to a beam management procedure to enhance communications efficiency in a wireless communications system. The described techniques resolve some challenges related to some techniques for signaling for beam management procedures. The wireless communications system 200 may enable the use of sensor information for efficient communication between a transmitter and a receiver (e.g., base station 105 and UE 115-*a*). In some cases, the wireless communications system 200 may support feedback signaling on several channels. Such channels may include a PUCCH, a physical downlink control channel (PDCCH), etc.

In order to find at least one beam pair for communication, the base station 105-*a* may perform a beam management procedure with the UE 115-*a*. In some examples, the base station 105-*a* may perform a beam management procedure with the UE 115-*a*. The base station 105-*a* may be configured with multiple antennas, which may be used for directional or beamformed transmissions (e.g., beamformed communication beams 220). Similarly, the UE 115-*a* may be configured with multiple antennas, which may be used for directional or beamformed transmissions (e.g., beamformed communication beams 225). In some examples, the beam management procedure may include a beam sweep procedure. As illustrated, the base station 105-*a* and/or the UE 115-*a* may transmit a number of beamformed communication beams 220, 225 in different directions within a coverage area.

As part of the beam management procedure, the base station 105-*a* and the UE 115-*a* may synchronize before the base station 105-*a* schedules and allocates resources (e.g., time and frequency resources) for uplink and/or downlink communication between the base station 105-*a* and the UE 115-*a*. In some cases, the base station 105-*a* and the UE 115-*a* may repeat the beam sweep pattern over different communication beams 220, 225 in an order which may be determined according to a given beam sweep pattern. The base station 105-*a* and the UE 115-*a* may have at least one active communication beam pair that is being used for wireless communications, as a result of the beam management procedure.

The base station 105-*a* may communicate with the UE 115-*a* on an active communication beam 220-*a*, and the UE 115-*a* may communicate with the base station 105-*a* on an active communication beam 225-*a*. The active communication beam may be used for transmitting transmission 230 and transmission 235, such as data and control information. The active communication beam may be a downlink receive beam and an uplink transmit beam for the UE 115-*a*, or a downlink transmit beam and an uplink receive beam for the base station 105-*a*. In some aspects, an active communication beam may change, for example, due to mobility, interference, blockage, and the like. In some cases, the base station 105-*a* may identify a change to an active communication beam, such as due to blockage, and may transmit a beam switch signal, also referred to as a beam switch command, to the UE 115-*a*. In some cases, the beam switch signal may identify a beam switch occasion for the UE 115-*a*.

In some wireless communications systems, the base station 105-*a* can switch a downlink control beam after reception of an acknowledgement from the UE 115-*a* that a beam switch command was successfully received. However, some wireless communications systems enable aspects of communications (such as, initial access, beam tracking, power control, beam reporting, etc.) between a transmitter and a receiver using signals transmitted by the transmitter and the receiver. Specifically, some wireless communications systems support communications between transmitters and receivers by identifying signaling between a transmitter at a receiver.

Therefore, the wireless communications system 200, applying the techniques described herein, may support using sensor information to efficiently perform beam management procedures. Specifically, the techniques described herein provide for enhancing communications efficiency and reducing latency in the wireless communications system 200, while resolving some challenges related to techniques for beam management procedures. Specifically, the wireless communications system 200 supports the use of sensor information to identify the location of the base station 105-*a* or the UE 115-*a* or both. Additionally, the transmitters and receivers described herein (e.g., base station 105-*a* and UE 115-*a*) may use one or more embedded sensors to identify a number of antennas included in a second transmitter, a second receiver, or both. Having knowledge of a location of a transmitter and a receiver (e.g., the base station 105-*a* or UE 115-*a*) and a number of antennas of the transmitter and the receiver, may aid in determining directional beamforming (such as, digital beamforming or analog beamforming or hybrid beamforming where both digital and analog beamforming are used). Additionally or alternatively, the wireless communications system 200 may provide for the use of sensor information (such as, image information, radar information, lidar information) for beam tracking, blockage prediction and handover.

According to one or more aspects of the present disclosure, the wireless communications system 200 may support using sensor information to determine a relative location of transmitters (e.g., base station 105-*a* or UE 115-*a*) from a physical location of a receiver. In some examples, knowledge of the relative location may be useful for the receiver (e.g., base station 105-*a* or UE 115-*a*) to perform handover, joint transmission, and dynamic point selection. Additionally or alternatively, knowledge of the relative location of transmitters from different operators may be useful for a receiver to perform inter-operator interference mitigation.

According to some aspects, the wireless communications system 200 may enable the use of sensor information to enhance beam management procedure at the UE 115-*a* and the base station 105-*a*. Specifically, the wireless communications system 200 may provide for techniques to receive sensor information (such as, image information, radio detection and ranging sensor, light detection and ranging sensor, and other environment information) using a sensor embedded within the UE 115-*a* and the base station 105-*a*. The UE 115-*a* and/or the base station 105-*a* may then perform a beam management procedure based on the received sensor information and communicate according to the beam management procedure. In some examples, the wireless communications system 200 may support the use of camera or other sensors like radio detection and ranging sensor and light detection and ranging sensor, to identify an objective dynamically.

In some cases, a UE 115-*a* (e.g., first communications device) may include a sensor 240-*b* embedded within the UE 115-*a*. Similarly, the base station 105-*a* may include a sensor 240-*a* embedded within the base station 105-*a*. For example, the sensor 240-*a* and the sensor 240-*b* may include a camera, a radio detection and ranging sensor, a light detection and ranging sensor, etc. Although depicted as one sensor unit, it may be understood that the camera, the radio detection and ranging sensor and the light detection and ranging sensor may be different sensors embedded in the base station 105-*a* or the UE 115-*a* or both. In one aspect, the UE 115-*a* may receive an image of a base station 105-*a* (e.g., second communications device) using the camera (e.g., sensor 240-*b*), and may perform image processing on the image captured by the camera to identify at least one antenna of the base station 105-*a*. Additionally or alternatively, the UE 115-*a* may receive, via the camera (e.g., sensor 240-*b*), multiple images of a base station 105-*a*. The UE 115-*a* may then apply machine-learning algorithms to process the images (such as, perform image stitching) and identify at least one antenna of the base station 105-*a*.

Similarly, the base station 105-*a* may receive an image of a UE 115-*a* using a camera (e.g., sensor 240-*a*) embedded within the base station 105-*a*. In some examples, the base station 105-*a* may perform image processing on the image captured by the camera to identify at least one antenna of the UE 115-*a*. According to one aspect, the UE 105-*a* may use signals received from a radio detection and ranging sensor or a light detection and ranging sensor or both, to identify one or more antennas of the base station 105-*a*. Additionally or alternatively, the UE 115-*a* may use environment information to identify antennas (such as, antennas of the base station 105-*a*) from the received signals. Such information and/or signals may be used for communications between the UE 115-*a* and the base station 105-*a*. In some instances, the base station 105-*a* may use signals received from a radio detection and ranging sensor or a light detection and ranging sensor (e.g., received from sensor 240-*b*) or both, to identify the UE 115-*a*.

According to some aspects, the UE 115-*a* may identify or determine locations of one or more base stations 105-*a*, and the UE 115-*a* may use the location information for beam selection, beam measurement and handover indication. In one example, the UE 115-*a* may predict a potential blockage of a UE beam corresponding to a base station beam based on receiving sensor information (from sensor 240-*a*) associated with the base station 105-*a*. In some instances, a moving UE 115-*a* can infer through a camera (e.g., sensor 240-*b*) that a downlink base station beam is predicted to be blocked (because the UE is about to pass across a wall). As depicted in the example of FIG. 2, the UE 115-*a* may determine an obstacle 250 between the base station 105-*a* and the UE 115-*a*. In such cases, the UE 115-*a* can proactively notify the base station 105-*a* that the downlink beam is going to be blocked, and the base station 105-*a* can switch the downlink beam to a secondary beam prior to a failure of the downlink base station beam. In the example of FIG. 2, the UE 115-*a* may determine that the downlink beam 220-*b* is blocked or will be blocked by the obstacle 250. The UE 115-*a* may indicate the potential blockage, and the base station 105-*a* may switch the downlink beam to beam 220-*a*. Accordingly, the UE 115-*a* may switch a receive beam from the receive beam 225-*b* to the receive beam 225-*a*.

In some examples, the UE 115-*a* may receive an image of the base station 105-*a* and environment information associated with the base station 105-*a*. The UE 115-*a* may analyze the environment information (such as, one more objects surrounding the base station 105-*a*) to predict the potential blockage. In one example, the UE 115-*a* may have an established UE beam 225 corresponding to a base station beam 220. The UE 115-*a* may analyze the sensor information (such as, using machine-learning techniques) to determine that the one more objects surrounding the base station 105-*a* may lead to blockage of the established UE beam 225. In such cases, the UE 115-*a* may transmit, to the base station 105-*a*, a signal indicating the potential blockage of the UE beam 225. Upon receiving the indication of the potential blockage, the base station 105-*a* may transmit an indication to perform a beam switch procedure prior to failure of the UE beam (e.g., established UE beam 225).

The base station 105-*a* may determine one or more transmission configuration indicator (TCI) states (e.g., one or more beams) to activate and signal the active TCI states to the UE 115-*a*. As depicted herein, beam indication may be based on a configuration and downlink signaling of TCI states. Each TCI state may include, among other things, information about a reference signal (a CSI-RS or a synchronization signal block). By associating a downlink transmission with a TCI, the base station 105-*a* may configure the UE 115-*a* to assume that the downlink transmission is performed using the same spatial filter as the reference signal associated with that TCI. In some examples, a UE 115-*a* may be configured with 64 TCI states. For beam indication for physical downlink control channel, a subset of the configured candidate states may be assigned by RRC signaling to each configured CORESET. That is, a base station 105-*a* may use an RRC signaling to configure a subset of the configured TCI states for each CORESET. The base station 105-*a* may further use a MAC control element (MAC-CE) to dynamically indicate a specific TCI state per CORESET. For instance, a MAC-CE may be used to activate a set of TCI states for a UE 115-*a*. That is, if a UE 115-*a* determines a receiver-side beam direction for reception of the reference signal, then then UE 115-*a* can assume that the same beam direction for reception of the physical downlink control channel.

As depicted herein, the base station 105-*a* may use a downlink control indication to further determine a TCI state that is valid for a transmission. In some examples, the UE 115-*a* may determine a valid TCI state, and follow a base station 105-*a*. For physical downlink shared channel beam indication, there may two options depending on the scheduling offset. The scheduling offset may be based on the transmission timing of the physical downlink shared channel relative to the corresponding physical downlink control channel carrying scheduling information for the physical downlink shared channel. In one example, if the scheduling offset is greater than a threshold, the downlink control indication of the scheduling assignment may indicate the TCI state for the physical downlink shared channel transmission. In some examples, the UE 115-*a* may be configured with a subset of TCI states from the prior configured set of candidate TCI states. The base station 105-*a* may use the downlink control indication to indicates one or more TCI states valid for a scheduled physical downlink shared channel transmission. Alternatively, if the scheduling offset is less than a threshold, the UE 115-*a* may assume that the physical downlink shared channel transmission is quasi co-located with a corresponding physical downlink control channel transmission. In other words, the TCI state for the physical downlink control channel state indicated by MAC signaling may be assumed to be valid for the corresponding scheduled physical downlink shared channel transmission.

In some examples, the UE 115-*a* may switch beams without an explicit beam switch command. In particular, the beam switch may be performed through the beam indication procedure. In some cases, the UE 115-*a* may perform the beam switch procedure to switch to a second UE beam to track or otherwise identify a second base station beam based on the indication received from the base station 105-*a*. In some cases, the base station 105-*a* may indicate beam switch from a first UE beam 225 to a second UE beam 225, even when the first UE beam 225 has a higher priority than the second UE beam 225.

In some examples, the base station 105-*a* may predict a potential blockage of a base station beam corresponding to a UE beam based on receiving sensor information (e.g., from sensor 240-*b*) associated with the UE 115-*a*. According to one or more examples, the base station 105-*a* may receive an image of the UE 115-*a* and/or additional information associated with the UE 115-*a*. For example, the base station 105-*a* may use the sensor 240-*a* to capture an image of the UE 115-*a*. In some examples, the base station 105-*a* may analyze the sensor information to predict the potential blockage (due to obstacle 250 blocking a line of sight). In one example, the base station 105-*a* may transmit, to the UE 115-*a*, an indication to perform a beam switch procedure prior to failure of an established UE beam. That is, the wireless communications system 200 may provide for a base station 105-*a* to perform beam tracking, and to proactively switch a beam to a second preferred beam, upon determining that a certain beam is predicted to be blocked. For instance, the base station 105-*a* may transmit signaling indicating the beam switch occasion to the UE 105-*a* prior to failure of an established UE beam, instead of the beam failure recovery procedure. Thus, the present techniques provide for enhancing communications efficiency by proactively performing beam switching and bypassing the beam failure recovery procedure.

According to one or more aspects, as part of beam management procedure, the UE 115-*a* may report four downlink beams having high reference signal receive power values. In one example, the UE 115-*a* may determine that a downlink beam having a high reference signal receive power case (e.g., a line of sight beam) may be blocked. Upon predicting a blockage, the UE 115-*a* can suppress the reporting a first beam and report a second beam, where the first beam is stronger than the second beam. In some examples, the UE 115-*a* may report one or more additional beams. Thus, the UE 115-*a* may implicitly and proactively avoid reporting the first beam (e.g., line of sight beam) that is predicted to be blocked.

In some aspects of the present disclosure, the UE 115-*a* may determine a potential blockage of a UE beam and the UE 115-*a* may choose not to report that UE beam. In some examples, the UE 115-*a* may determine a first reference signal receive power associated with first UE beam and a second reference signal receive power associated with a second UE beam. In some cases, the first reference signal receive power may be greater than the second reference signal receive power. The UE 115-*a* may predict a potential blockage of the first UE beam (using methods described herein) based on receiving the information associated with a base station 105-*a*. Upon predicting the potential blockage, the UE 115-*a* may transmit a measurement report associated with the second UE beam. That is, the UE 115-*a* may refrain from reporting the first UE beam (e.g., a UE beam with a higher reference signal receive power) if the UE 115-*a* detects a potential blockage of the first UE beam. Additionally, the UE 115-*a* may receive additional sensor information associated with a second UE 115-*a* and may perform an interference management associated with the second UE 115-*a* based on receiving the sensor information.

Additionally or alternatively, the UE 115-*a* may transmit a signal to the base station 105-*a* indicating whether the UE 115-*a* is located within a line of sight of the base station 105-*a*. For instance, the UE 115-*a* may analyze sensor information associated with the base station 105-*a* to determine that the UE 115-*a* is located on a line of sight of the base station 105-*a*. The UE 115-*a* may then transmit a signal indicating that the UE 115-*a* is located on the line of sight. In some cases, the UE 115-*a* may transmit the signal each time the UE 115-*a* determines that it is located within the line of sight of the base station 105-*a*. Alternatively, the UE 115-*a* may periodically transmit the signal indicating whether the UE 115-*a* is located within the line of sight of the base station 105-*a*. In some examples, the UE 115-*a* may perform power control (e.g., transmit power control) for transmitting a signal based on determining that the UE 115-*a* is located on the line of sight of the base station 105-*a*. In some instances, the knowledge of whether the UE 115-*a* is located on the line of sight of the base station 105-*a* may affect the transmit power control at the UE 115-*a*. Additionally or alternatively, the UE 115-*a* may establish an initial access procedure at the base station 105-*a* based on receiving sensor information associated with the base station 105-*a*.

According to some aspects of the present disclosure, the UE 115-*a* may receive, via a camera included within the UE 115-*a*, an image including a first base station 105-*a* and a second base station 105-*a*. The UE 115-*a* may analyze the image to determine a location of the second base station. For instance, base station antennas may be visible in some deployments, and the UE 115-*a* may detect the antennas by implementing machine-learning algorithms at the UE 115-*a*. In some cases, the UE 115-*a* may detect that a UE beam established with the first base station is about to fail. In such cases, the UE 115-*a* may indicate to the first base station 105-*a* to perform a handover procedure to handover the UE 115-*a* from the first base station 105-*a* to the second base station 105-*a* based on the determining the location of the second base station. In some cases, the UE 115-*a* may couple information received from an image with additional information received from other sensors. The UE 115-*a* may then use the coupled information to handover to the second base station 105-*a*.

Figure 3:
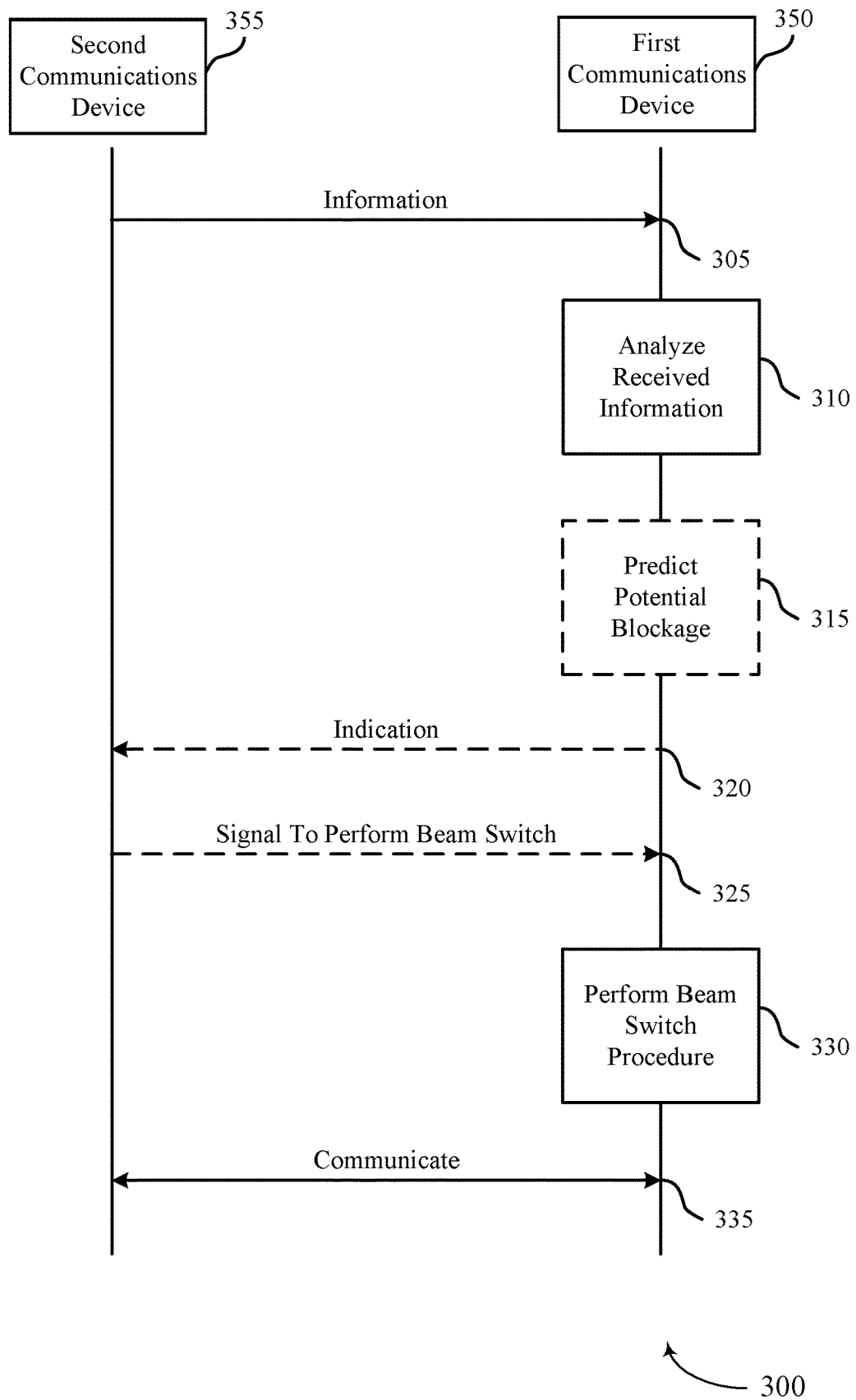
FIG. 3 illustrates an example of a process flow that supports techniques for using sensor information for wireless communications in accordance with one or more aspects of the present disclosure.

FIG. 3 illustrates an example of a process flow 300 that supports techniques for using sensor information for wireless communications in accordance with one or more aspects of the present disclosure. In some examples, process flow 300 may implement aspects of wireless communications system 100 and wireless communications system 200. A first communications device 350 may be an example of a base station 105 and a UE 115 described with reference to FIGS. 1 and 2. A second communications device 355 may be an example of a base station 105 and a UE 115 described with reference to FIGS. 1 and 2.

In the following description of the process flow 300, the operations between the first communications device 350 and the second communications device 355 may be transmitted in a different order than the exemplary order shown. The operations performed by the first communications device 350 or the second communications device 355 may be performed in different orders or at different times than the exemplary order shown. Some operations may also be omitted from the process flow 300, or other operations may be added to the process flow 300. Further, the first communications device 350 and the second communications device 355 are not limiting, as the described features may be associated with any number of different devices.

At 305, the first communications device 350 may use a sensor included within the first communications device 350 to receive information associated with the second communications device 355. In some examples, the first communications device 350 may receive, via a camera included within the first communications device 350, an image of the second communications device 355. Additionally or alternatively, the first communications device 350 may receive, via a radio detection and ranging sensor included within the first communications device 350, a signal associated with the second communications device 355. In some examples, the first communications device 350 may receive, via a radio detection and ranging sensor included within the first communications device 350, a signal associated with the second communications device 355.

At 310, the first communications device 350 may analyze the received information. For example, the first communications device 350 may process the image of the second communications device 355 to identify an antenna (e.g., antenna panel) of the second communications device 355. In some cases, the first communications device 350 may use the signal received via the radio detection and ranging sensor to identify an antenna of the second communications device 355. Additionally or alternatively, the first communications device 350 may use the signal received via the light detection and ranging sensor to identify an antenna of the second communications device 355.

At 315, the first communications device 350 may optionally predict a potential blockage of a first beam corresponding to a second communications device 355 beam based on receiving sensor information associated with the second communications device 355. Additionally or alternatively, the first communications device 350 may analyze the sensor information to determine whether the first communications device 350 is located in a line of sight of the second communications device 355 (not shown). The first communications device 350 may perform power control based on determining that the first communications device 350 is located in the line of sight.

Upon predicting the potential blockage, at 320, the first communications device 350 may optionally transmit, to the second communications device 355, a signal indicating the potential blockage of the first beam. Although not depicted herein, upon predicting the potential blockage the first communications device 350 may suppress reporting the first beam, and may report a second beam.

At 325, the second communications device 355 may optionally transmit an indication to perform a beam switch procedure prior to failure of the first beam. At 330, the first communications device 350 may perform the beam switch procedure to switch to a second beam to identify (e.g., track) a third beam based on the received indication. Additionally or alternatively, the first communications device 350 may determine, based on a beam indication, that a downlink beam has changed. In such examples, the first communications device 350 may accordingly change a corresponding receive beam to match a new downlink beam. At 335, the first communications device 350 may communicate with the second communications device 355 based on the performing the beam switch.

The operations performed by the second communications device 355 and the first communications device 350 as part of, but not limited to, process flow 300 may provide improvements to communication links in wireless communications systems. Furthermore, the operations performed by the second communications device 355 and the first communications device 350 as part of, but not limited to, process flow 300 may provide benefits and enhancements to the operation of the first communications device 350 while performing communications having a high reliability and low latency. For example, the described methods in the process flow 300 may support using sensor information for channel monitoring and wireless communications, among other enhancements.

Figure 4:
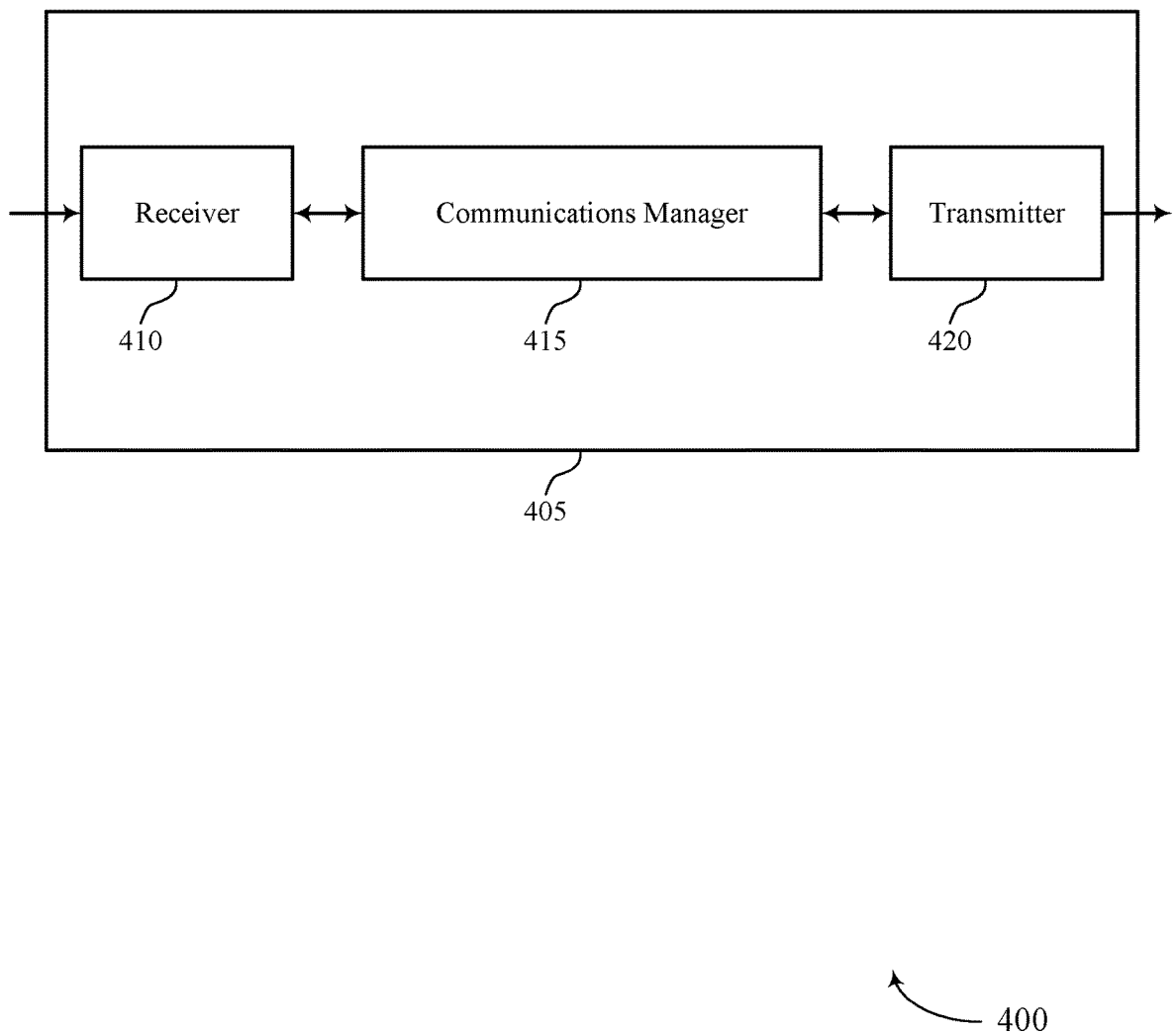
FIGS. 4 and 5 show block diagrams of devices that support techniques for using sensor information for wireless communications in accordance with one or more aspects of the present disclosure.

FIG. 4 shows a block diagram 400 of a device 405 that supports techniques for using sensor information for wireless communications in accordance with one or more aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for using sensor information for wireless communications, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, via a sensor included within a first communications device, information associated with a second communications device, perform, at the first communications device and based on the received information, a beam management procedure to identify at least one transmit beam or receive beam, and communicate with the second communications device based on the beam management procedure.

The communications manager 415 may receive, via a sensor included within a UE, information associated with a base station, perform, at the UE, a power control procedure based on the received information, and communicate with the base station based on performing the power control procedure.

The communications manager 415 may receive, via a sensor included within a UE, information associated with a first base station and a second base station, determine a location of the second base station based on the information associated with the first base station and the second base station, and perform a handover of the UE from the first base station to the second base station based on determining the location of the second base station. The communications manager 415 may be an example of aspects of the communications manager 710 described herein.

The communications manager 415 may be an example of means for performing various aspects of using sensor information for wireless communications as described herein. The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In some examples, the communications manager 415 may be configured to perform various operations (e.g., receiving, performing, communicating) using or otherwise in cooperation with the receiver 410, the transmitter 420, or both.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

The actions performed by the communications manager 415 as described herein may be implemented to realize one or more potential enhancements. For example, In some examples, the communications manager 415 may decrease communication latency and enhance channel throughput for wireless communications. The improvements in the communication link (for example, decreasing communication latency and increasing reliability) may further save power and increase battery life at a UE 115 (for example, by reducing complexity and retransmissions).

Figure 5:
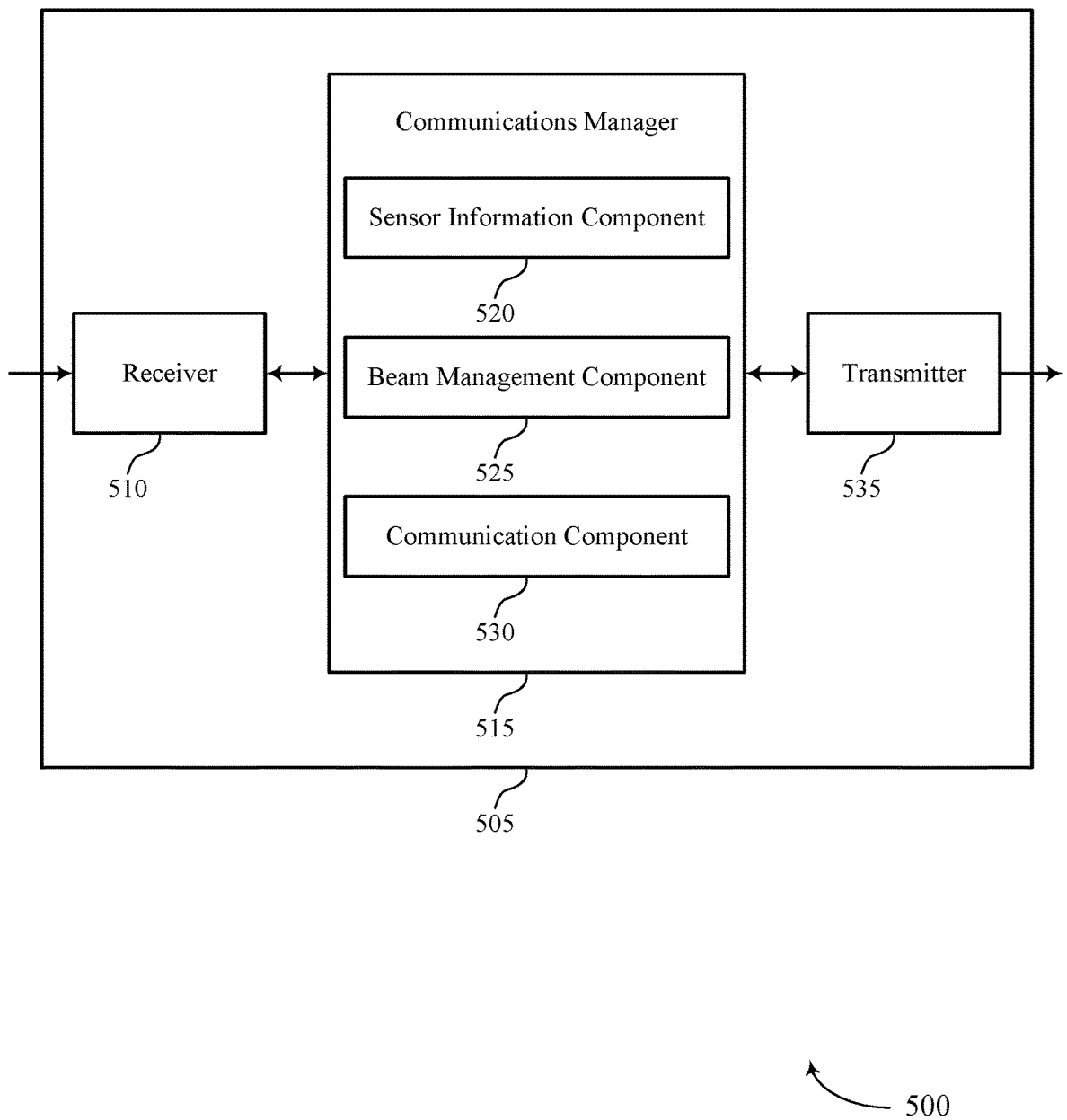

FIG. 5 shows a block diagram 500 of a device 505 that supports techniques for using sensor information for wireless communications in accordance with one or more aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to techniques for using sensor information for wireless communications, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a sensor information component 520, a beam management component 525, and a communication component 530. The communications manager 515 may be an example of aspects of the communications manager 710 described herein.

The sensor information component 520 may receive, via a sensor included within a first communications device, information associated with a second communications device. The beam management component 525 may perform, at the first communications device and based on the received information, a beam management procedure to identify at least one transmit beam or receive beam. The communication component 530 may communicate with the second communications device based on the beam management procedure.

The sensor information component 520 may receive, via a sensor included within a UE, information associated with a base station. The beam management component 525 may perform, at the UE, a power control procedure based on the received information. The communication component 530 may communicate with the base station based on performing the power control procedure.

The sensor information component 520 may receive, via a sensor included within a UE, information associated with a first base station and a second base station and estimate a location of the second base station based on the information associated with the first base station and the second base station. The communication component 530 may perform a handover of the UE from the first base station to the second base station based on estimating the location of the second base station.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
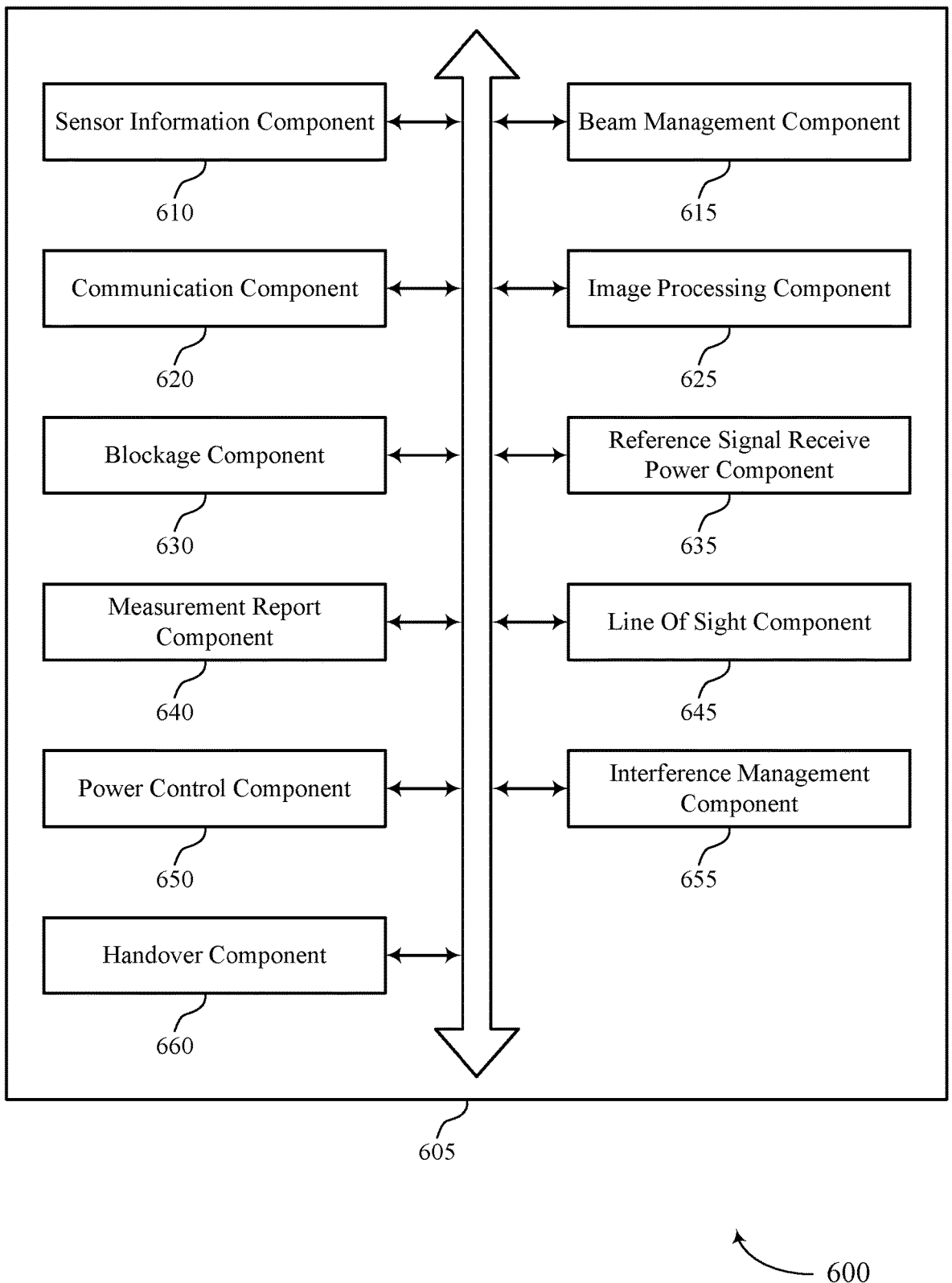
FIG. 6 shows a block diagram of a communications manager that supports techniques for using sensor information for wireless communications in accordance with one or more aspects of the present disclosure.

FIG. 6 shows a block diagram 600 of a communications manager 605 that supports techniques for using sensor information for wireless communications in accordance with one or more aspects of the present disclosure. The communications manager 605 may be an example of aspects of a communications manager 415, a communications manager 515, or a communications manager 710 described herein. The communications manager 605 may include a sensor information component 610, a beam management component 615, a communication component 620, an image processing component 625, a blockage component 630, a reference signal receive power component 635, a measurement report component 640, a line of sight component 645, a power control component 650, an interference management component 655, and a handover component 660. Each of these modules may communicate, directly or indirectly, with one another (e.g., via one or more buses).

The sensor information component 610 may receive, via a sensor included within a first communications device, information associated with a second communications device. The beam management component 615 may perform, at the first communications device and based on the received information, a beam management procedure to identify at least one transmit beam or receive beam. The communication component 620 may communicate with the second communications device based on the beam management procedure.

The sensor information component 610 may receive, via a sensor included within a UE, information associated with a base station. The beam management component 615 may perform, at the UE, a power control procedure based on the received information. The communication component 620 may communicate with the base station based on performing the power control procedure.

The sensor information component 610 may receive, via a sensor included within a UE, information associated with a first base station and a second base station and estimate a location of the second base station based on the information associated with the first base station and the second base station. The communication component 620 may perform a handover of the UE from the first base station to the second base station based on estimating the location of the second base station.

In some examples, the sensor information component 610 may receive, via a camera included within the UE, an image of the base station. The image processing component 625 may process the image of the base station to identify an antenna panel of the base station, where the beam management procedure is based on identifying the antenna of the base station.

The blockage component 630 may predict a potential blockage of the at least one transmit beam corresponding to the at least one receive beam based on receiving the information associated with the base station. In some examples, the blockage component 630 may transmit, to the base station, a signal indicating the potential blockage of the at least one transmit beam. In some examples, the beam management component 615 may receive, from the base station, an indication to perform a beam switch procedure prior to failure of the at least one transmit beam. In some examples, the beam management component 615 may perform the beam switch procedure to switch to a second transmit beam to track a second receive beam based on the received indication. In some cases, the at least one transmit beam has a higher priority than the second transmit beam.

The reference signal receive power component 635 may determine a first reference signal receive power associated with the at least one transmit beam and a second reference signal receive power associated with a second transmit beam, where the first reference signal receive power is greater than the second reference signal receive power. In some examples, the blockage component 630 may predict a potential blockage of the at least one transmit beam based on receiving the information associated with the base station. The measurement report component 640 may transmit, to the base station and based on predicting the potential blockage of the at least one transmit beam, a measurement report associated with the second transmit beam.

The line of sight component 645 may determine that the UE is located on a line of sight of the base station based on receiving the information associated with the base station. In some examples, the line of sight component 645 may transmit, to the base station, a signal indicating that the UE is located on the line of sight of the base station.

The power control component 650 may perform, at the UE, a power control procedure based on determining that the UE is located on the line of sight of the base station. In some examples, the sensor information component 610 may receive, via the sensor included within the UE, additional information associated with a second UE. The interference management component 655 may perform, at the UE, an interference management associated with the second UE based on receiving the information associated with the base station and the additional information associated with the second UE.

In some examples, the beam management component 615 may establish an initial access procedure at the base station based on receiving the information associated with the base station. In some examples, the sensor information component 610 may receive, via a camera included within the UE, an image including the base station and a second base station. In some examples, the sensor information component 610 may estimate a location of the second base station based on the image. The handover component 660 may perform a handover of the UE from the base station to the second base station based on the estimating the location of the second base station.

In some examples, the sensor information component 610 may receive, via a radio detection and ranging sensor included within the UE, a signal identifying an antenna of the base station, where the beam management procedure is based on identifying the antenna. In some examples, the sensor information component 610 may receive, via a light detection and ranging sensor included within the UE, a signal identifying an antenna of the base station, where the beam management procedure is based on identifying the antenna. In some cases, the information associated with the base station includes environment information identifying an antenna panel of the base station.

Figure 7:
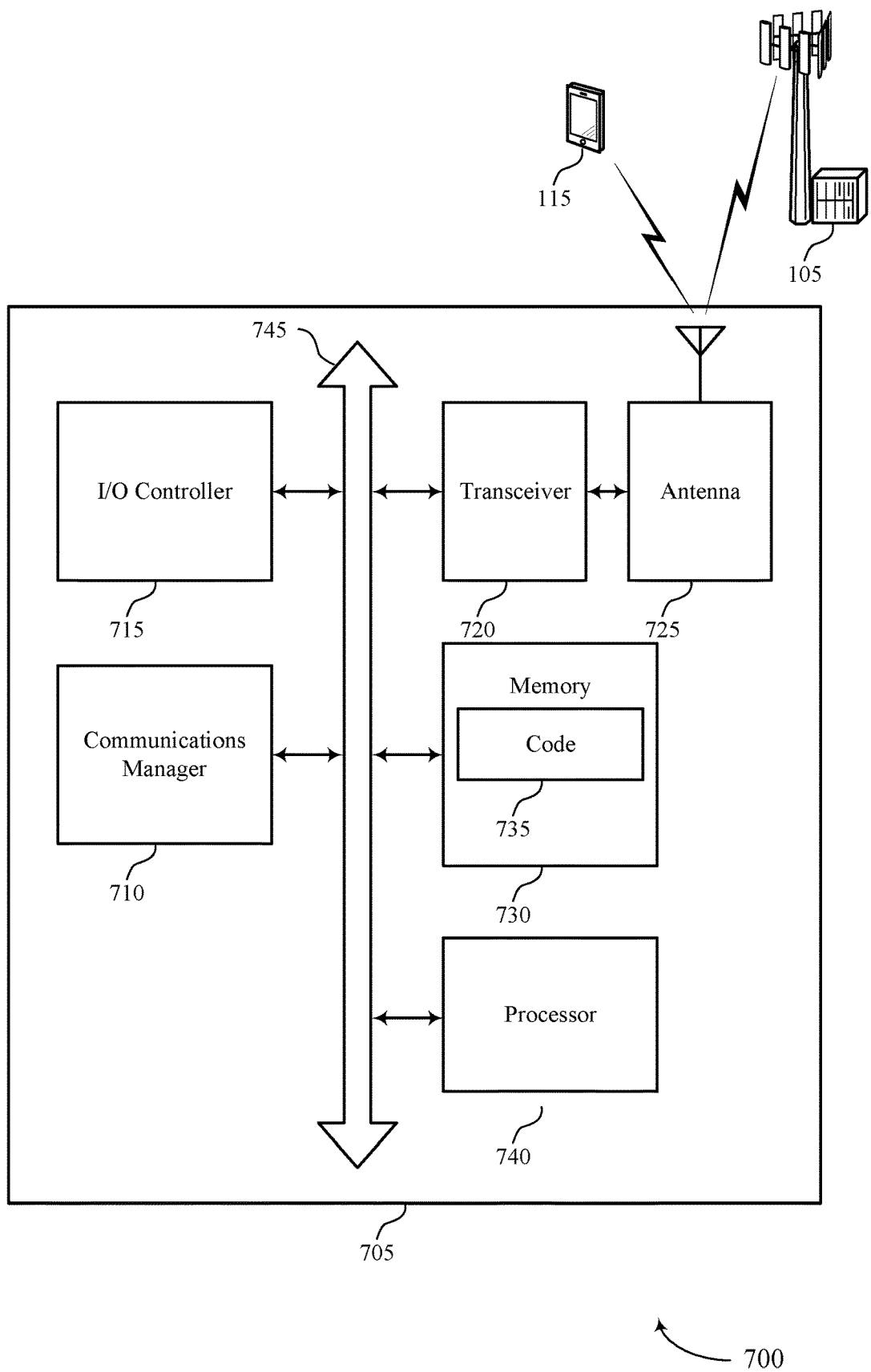
FIG. 7 shows a diagram of a system including a device that supports techniques for using sensor information for wireless communications in accordance with one or more aspects of the present disclosure.

FIG. 7 shows a diagram of a system 700 including a device 705 that supports techniques for using sensor information for wireless communications in accordance with one or more aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, via a sensor included within the UE, information associated with a base station, perform, at the UE and based on the received information, a beam management procedure to track a UE beam corresponding to a base station beam, and communicate with the base station based on the beam management procedure.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may have a capability to concurrently transmit or receive multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for using sensor information for wireless communications).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
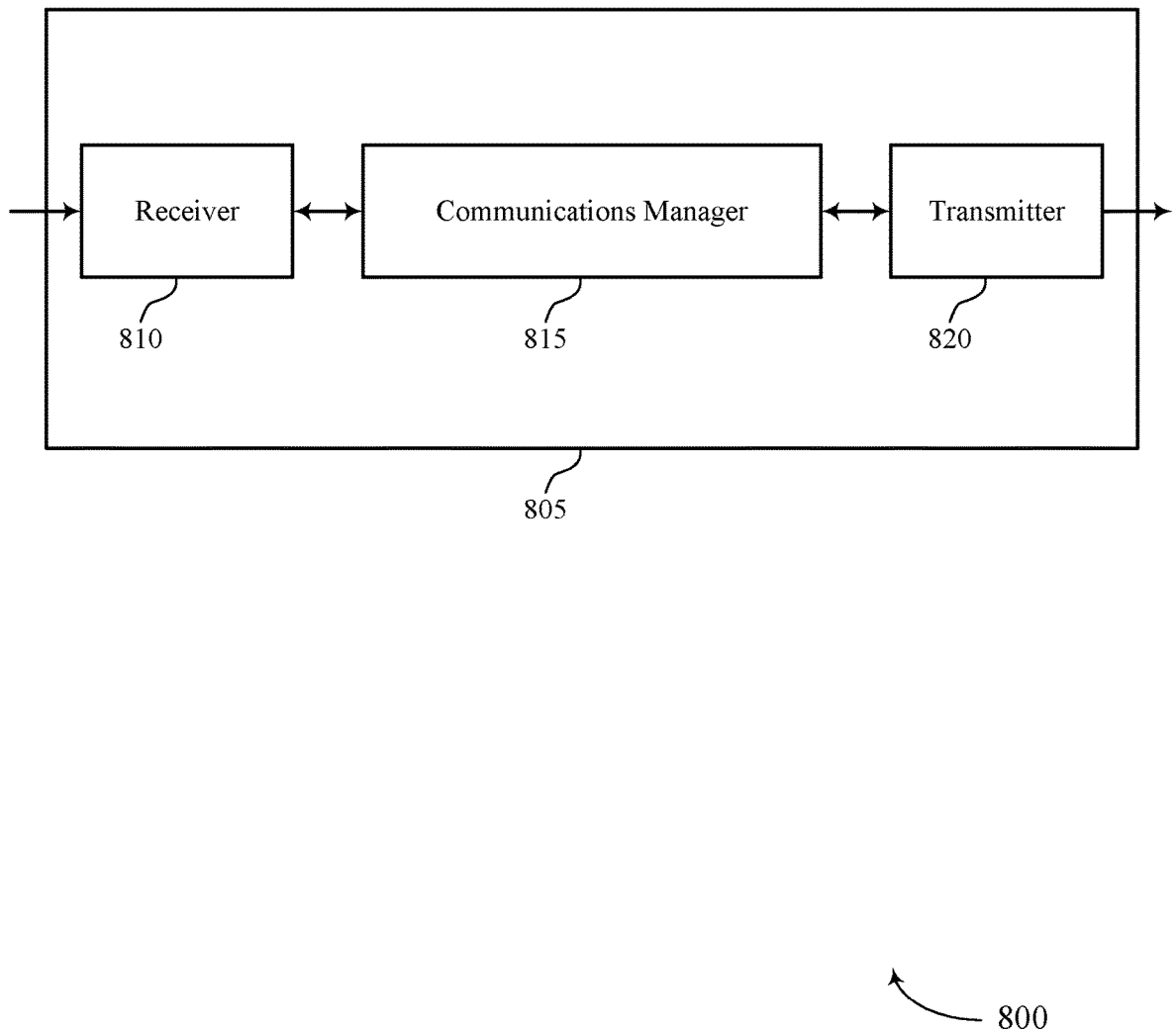
FIGS. 8 and 9 show block diagrams of devices that support techniques for using sensor information for wireless communications in accordance with one or more aspects of the present disclosure.

FIG. 8 shows a block diagram 800 of a device 805 that supports techniques for using sensor information for wireless communications in accordance with one or more aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for using sensor information for wireless communications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, via a sensor included within the base station, information associated with a UE, perform, at the base station and based on the received information, a beam management procedure to track a UE beam corresponding to a base station beam, and communicate with the UE based on performing the beam management procedure. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
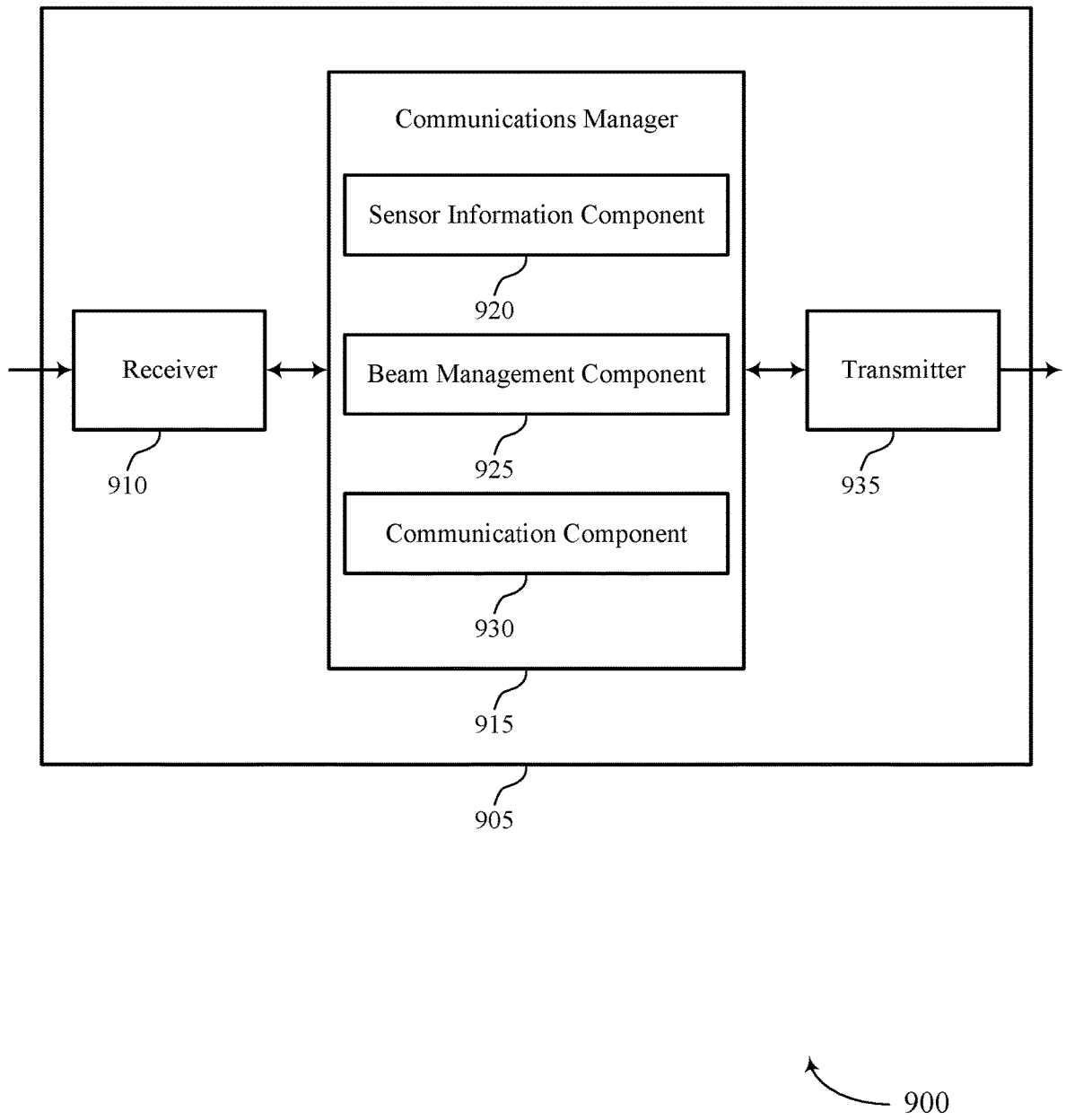

FIG. 9 shows a block diagram 900 of a device 905 that supports techniques for using sensor information for wireless communications in accordance with one or more aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to techniques for using sensor information for wireless communications, etc.). Information may be passed on to other components of the device 905.

The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a sensor information component 920, a beam management component 925, and a communication component 930. The communications manager 915 may be an example of aspects of the communications manager 1110 described herein.

The sensor information component 920 may receive, via a sensor included within the base station, information associated with a UE. The beam management component 925 may perform, at the base station and based on the received information, a beam management procedure to track a UE beam corresponding to a base station beam. The communication component 930 may communicate with the UE based on performing the beam management procedure.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
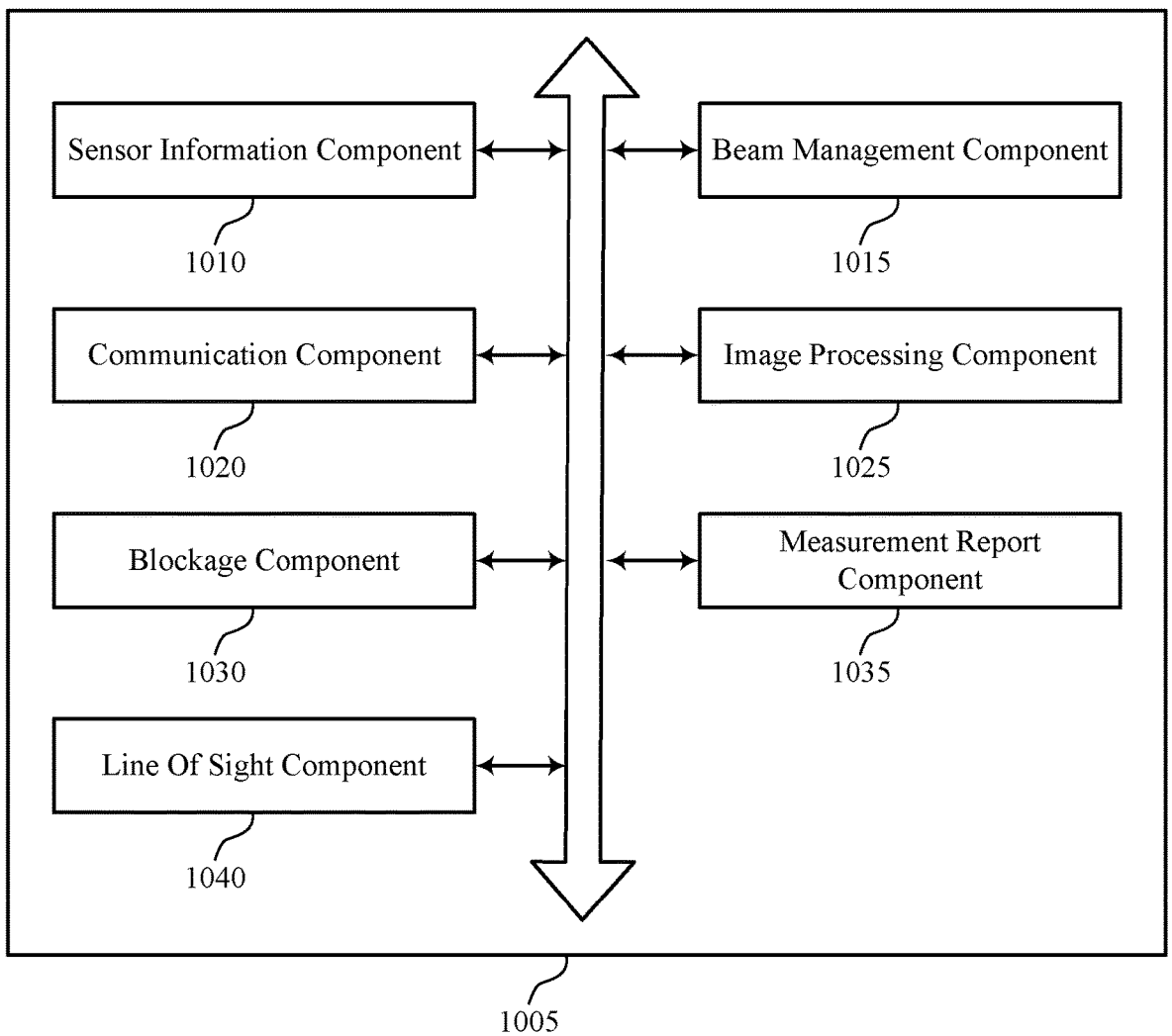
FIG. 10 shows a block diagram of a communications manager that supports techniques for using sensor information for wireless communications in accordance with one or more aspects of the present disclosure.

FIG. 10 shows a block diagram 1000 of a communications manager 1005 that supports techniques for using sensor information for wireless communications in accordance with one or more aspects of the present disclosure. The communications manager 1005 may be an example of aspects of a communications manager 815, a communications manager 915, or a communications manager 1110 described herein. The communications manager 1005 may include a sensor information component 1010, a beam management component 1015, a communication component 1020, an image processing component 1025, a blockage component 1030, a measurement report component 1035, and a line of sight component 1040. Each of these modules may communicate, directly or indirectly, with one another (e.g., via one or more buses).

The sensor information component 1010 may receive, via a sensor included within the base station, information associated with a UE. The beam management component 1015 may perform, at the base station and based on the received information, a beam management procedure to track a UE beam corresponding to a base station beam. The communication component 1020 may communicate with the UE based on performing the beam management procedure.

In some examples, the sensor information component 1010 may receive, via a camera included within the base station, an image of the UE. The image processing component 1025 may process the image of the UE to identify the UE, where the beam management procedure is based on identifying the UE.

The blockage component 1030 may predict a potential blockage of the base station beam corresponding to the UE beam based on receiving the information associated with the UE. In some examples, the beam management component 1015 may transmit, to the UE and based on predicting the potential blockage, an indication to perform a beam switch procedure to switch to a second UE beam to track a second base station beam prior to failure of the base station beam.

In some examples, the blockage component 1030 may receive, from the UE, a signal indicating a potential blockage of the UE beam. In some examples, the beam management component 1015 may transmit, to the UE and based on receiving the signal, an indication to perform a beam switch procedure to switch to a second UE beam to track a second base station beam prior to failure of the UE beam. In some cases, the UE beam has a higher priority than the second UE beam.

The measurement report component 1035 may receive, from the UE and based on a potential blockage of the UE beam, a measurement report associated with a second UE beam, where the UE is associated with a first reference signal receive power and the second UE beam is associated with a second reference signal receive power, the first reference signal receive power being greater than the second reference signal receive power. The line of sight component 1040 may receive, from the UE, a signal indicating that the UE is located on a line of sight of the base station, where performing the beam management procedure is based on the signal.

In some examples, the beam management component 1015 may establish an initial access of the UE based on receiving the information associated with the UE. In some examples, the sensor information component 1010 may receive, via a radio detection and ranging sensor included within the base station, a signal identifying the UE, where the beam management procedure is based on identifying the UE.

In some examples, the sensor information component 1010 may receive, via a light detection and ranging sensor included within the base station, a signal identifying the UE, where the beam management procedure is based on identifying the UE. In some cases, the information associated with the UE includes environment information identifying the UE.

Figure 11:
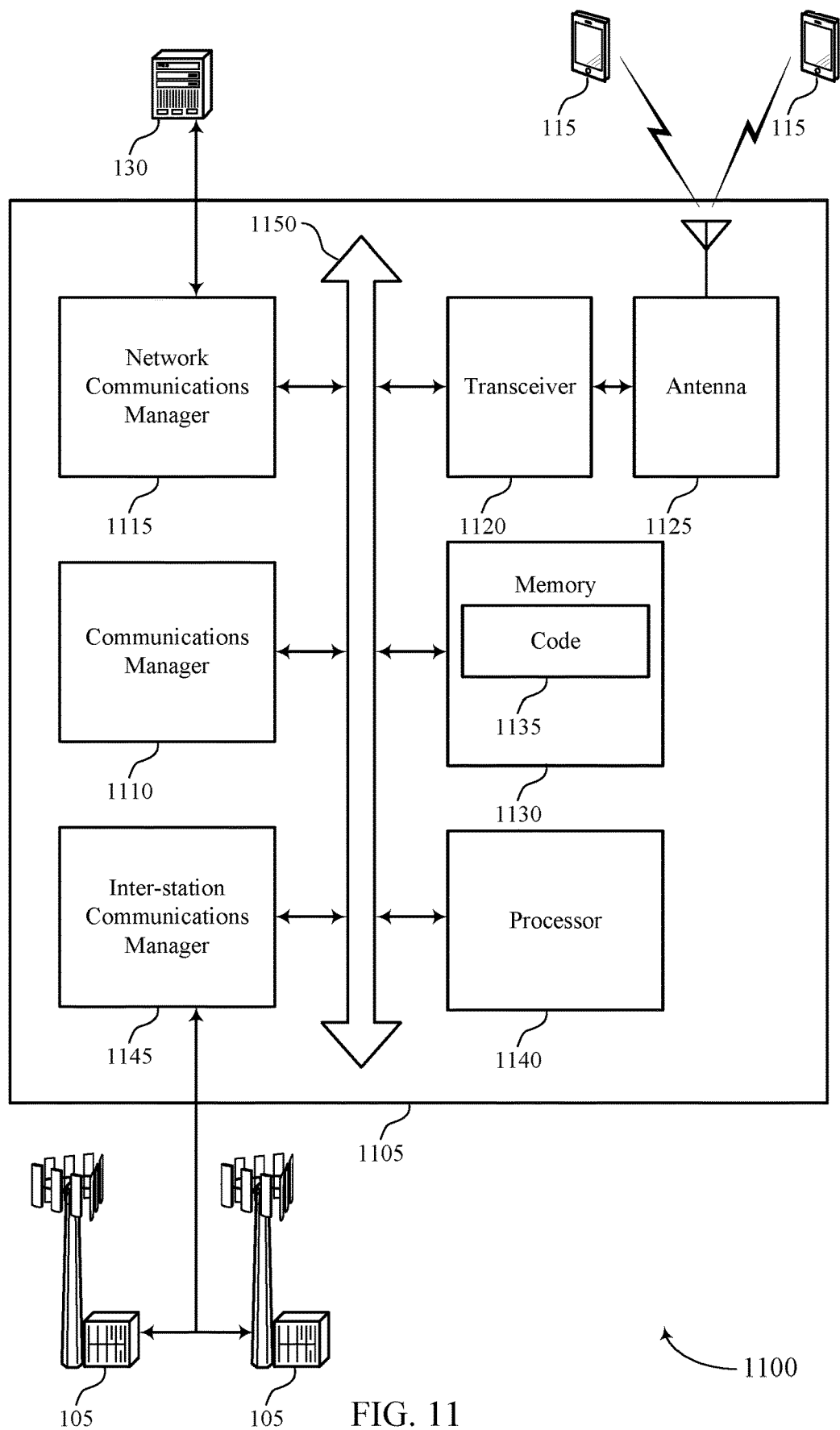
FIG. 11 shows a diagram of a system including a device that supports techniques for using sensor information for wireless communications in accordance with one or more aspects of the present disclosure.

FIG. 11 shows a diagram of a system 1100 including a device 1105 that supports techniques for using sensor information for wireless communications in accordance with one or more aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive, via a sensor included within the base station, information associated with a UE, perform, at the base station and based on the received information, a beam management procedure to track a UE beam corresponding to a base station beam, and communicate with the UE based on performing the beam management procedure.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may have a capability to concurrently transmit or receive multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting techniques for using sensor information for wireless communications).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
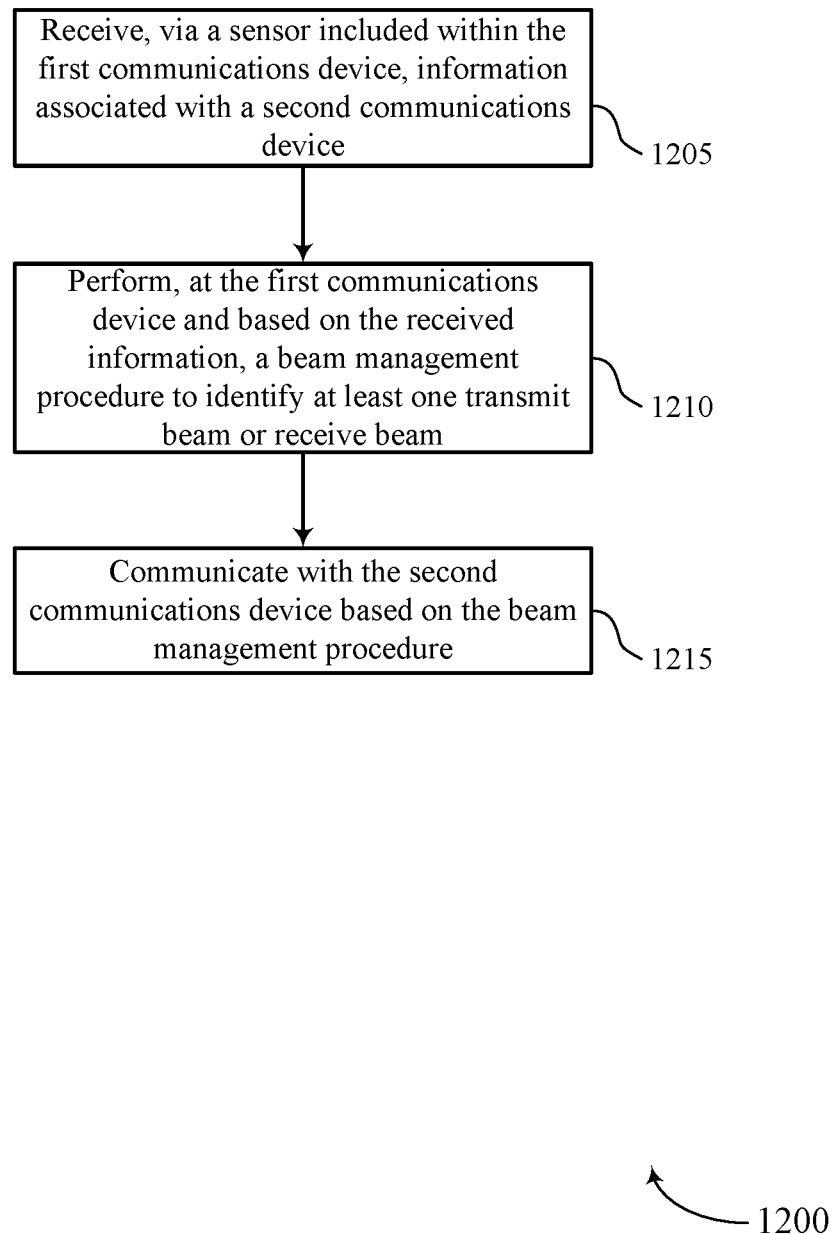
FIGS. 12 through 16 show flowcharts illustrating methods that support techniques for using sensor information for wireless communications in accordance with one or more aspects of the present disclosure.

FIG. 12 shows a flowchart illustrating a method 1200 that supports techniques for using sensor information for wireless communications in accordance with one or more aspects of the present disclosure. The operations of method 1200 may be implemented by a UE 115, a base station 105 or its components as described herein. For example, the operations of method 1200 may be performed by a communications manager as described with reference to FIGS. 4 through 7 and FIGS. 8 through 11. In some examples, a first communications device (e.g., UE or base station) may execute a set of instructions to control the functional elements of the first communications device to perform the functions described herein. Additionally or alternatively, a first communications device may perform aspects of the functions described herein using special-purpose hardware.

At 1205, the first communications device may receive, via a sensor included within the first communications device, information associated with a second communications device. The operations of 1205 may be performed according to the methods described herein. In some examples, aspects of the operations of 1205 may be performed by a sensor information component as described with reference to FIGS. 4 through 7 and FIGS. 8 through 11.

At 1210, the first communications device may perform, at the first communications device and based on the received information, a beam management procedure to identify a at least one transmit beam or receive beam. The operations of 1210 may be performed according to the methods described herein. In some examples, aspects of the operations of 1210 may be performed by a beam management component as described with reference to FIGS. 4 through 7 and FIGS. 8 through 11.

At 1215, the first communications device may communicate with the second communications device based on the beam management procedure. The operations of 1215 may be performed according to the methods described herein. In some examples, aspects of the operations of 1215 may be performed by a communication component as described with reference to FIGS. 4 through 7 and FIGS. 8 through 11.

Figure 13:
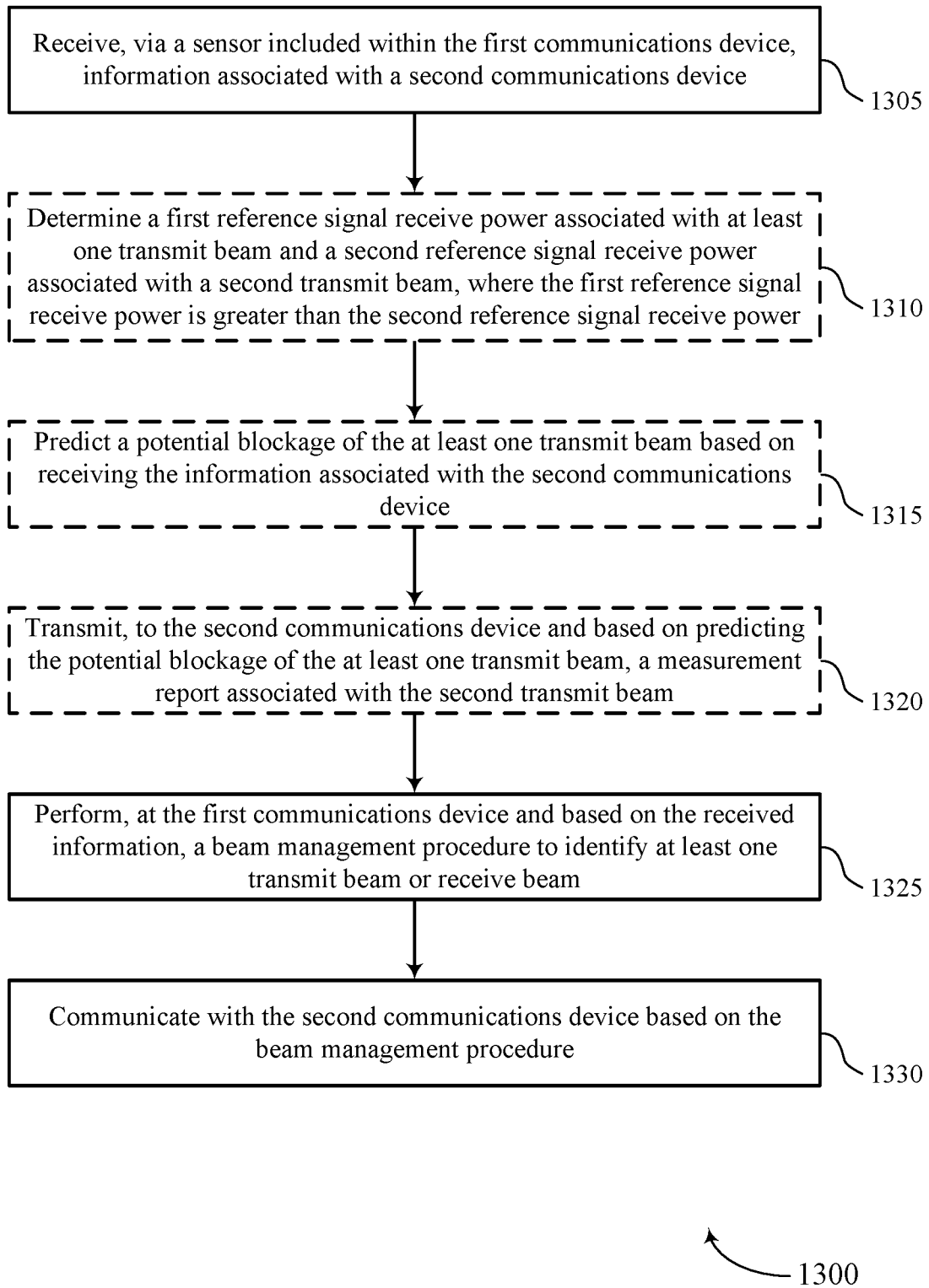

FIG. 13 shows a flowchart illustrating a method 1300 that supports techniques for using sensor information for wireless communications in accordance with one or more aspects of the present disclosure. The operations of method 1300 may be implemented by a UE 115 or its components as described herein. For example, the operations of method 1300 may be performed by a communications manager as described with reference to FIGS. 4 through 7. In some examples, a first communications device may execute a set of instructions to control the functional elements of the first communications device to perform the functions described herein. Additionally or alternatively, a first communications device may perform aspects of the functions described herein using special-purpose hardware.

At 1305, the first communications device may receive, via a sensor included within the first communications device, information associated with a second communications device. The operations of 1305 may be performed according to the methods described herein. In some examples, aspects of the operations of 1305 may be performed by a sensor information component as described with reference to FIGS. 4 through 7.

At 1310, the first communications device may optionally determine a first reference signal receive power associated with at least one transmit beam and a second reference signal receive power associated with a second transmit beam. In some examples, the first reference signal receive power is greater than the second reference signal receive power. The operations of 1310 may be performed according to the methods described herein. In some examples, aspects of the operations of 1310 may be performed by a reference signal receive power component as described with reference to FIGS. 4 through 7.

At 1315, the first communications device may optionally predict a potential blockage of the at least one transmit beam based on receiving the information associated with the second communications device. The operations of 1315 may be performed according to the methods described herein. In some examples, aspects of the operations of 1315 may be performed by a blockage component as described with reference to FIGS. 4 through 7.

At 1320, the first communications device may optionally transmit, to the second communications device and based on predicting the potential blockage of the at least one transmit beam, a measurement report associated with the second transmit beam. The operations of 1320 may be performed according to the methods described herein. In some examples, aspects of the operations of 1320 may be performed by a measurement report component as described with reference to FIGS. 4 through 7.

At 1325, the first communications device may perform, at the first communications device and based on the received information, a beam management procedure to identify at least one transmit beam or receive beam. In some cases, the first communications device may perform the beam management procedure based on transmitting the measurement report. The operations of 1325 may be performed according to the methods described herein. In some examples, aspects of the operations of 1325 may be performed by a beam management component as described with reference to FIGS. 4 through 7.

At 1330, the first communications device may communicate with the second communications device based on the beam management procedure. The operations of 1330 may be performed according to the methods described herein. In some examples, aspects of the operations of 1330 may be performed by a communication component as described with reference to FIGS. 4 through 7.

Figure 14:
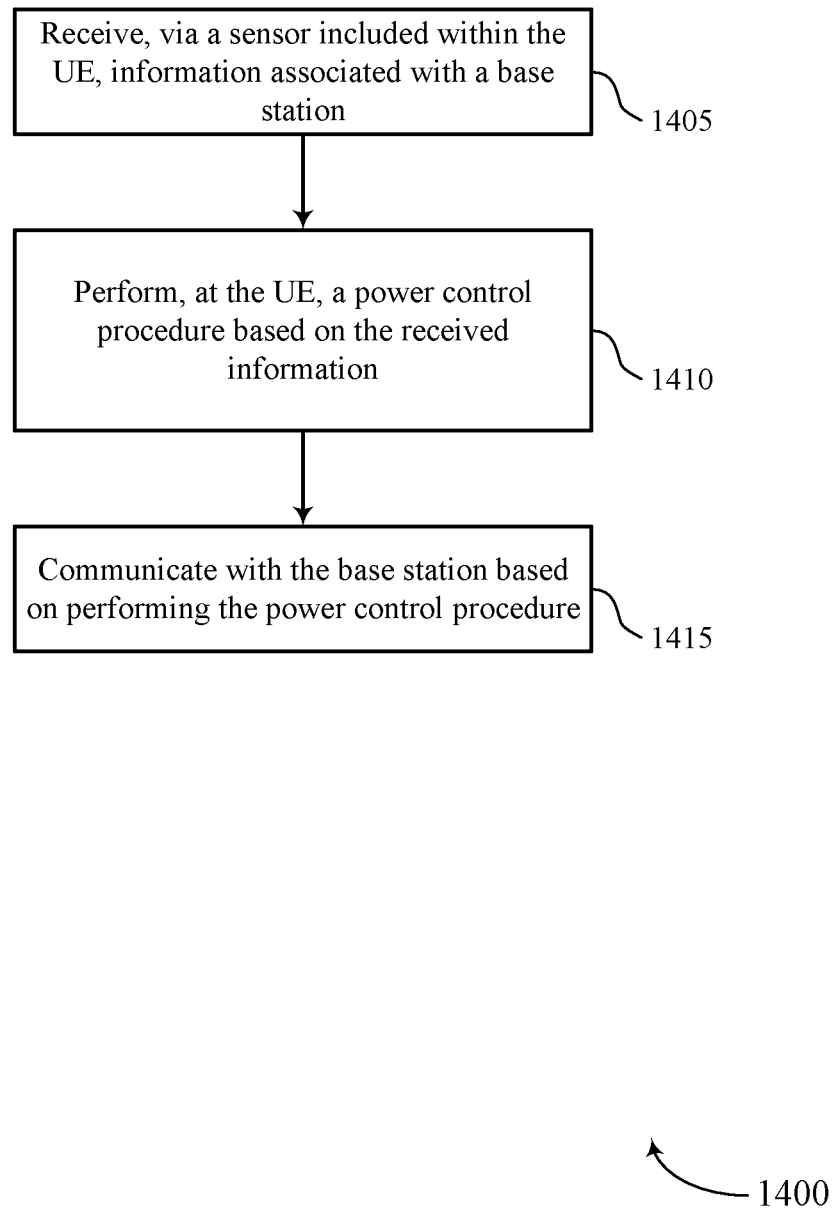

FIG. 14 shows a flowchart illustrating a method 1400 that supports techniques for using sensor information for wireless communications in accordance with one or more aspects of the present disclosure. The operations of method 1400 may be implemented by a UE 115 or its components as described herein. For example, the operations of method 1400 may be performed by a communications manager as described with reference to FIGS. 4 through 7. In some examples, a first communications device may execute a set of instructions to control the functional elements of the first communications device to perform the functions described herein. Additionally or alternatively, a first communications device may perform aspects of the functions described herein using special-purpose hardware.

At 1405, the UE may receive, via a sensor included within the UE, information associated with a base station. The operations of 1405 may be performed according to the methods described herein. In some examples, aspects of the operations of 1405 may be performed by a sensor information component as described with reference to FIGS. 4 through 7.

At 1410, the UE may perform, at the UE, a power control procedure based on the received information. The operations of 1410 may be performed according to the methods described herein. In some examples, aspects of the operations of 1410 may be performed by a beam management component as described with reference to FIGS. 4 through 7.

At 1415, the UE may communicate with the base station based on performing the power control procedure. The operations of 1415 may be performed according to the methods described herein. In some examples, aspects of the operations of 1415 may be performed by a communication component as described with reference to FIGS. 4 through 7.

Figure 15:
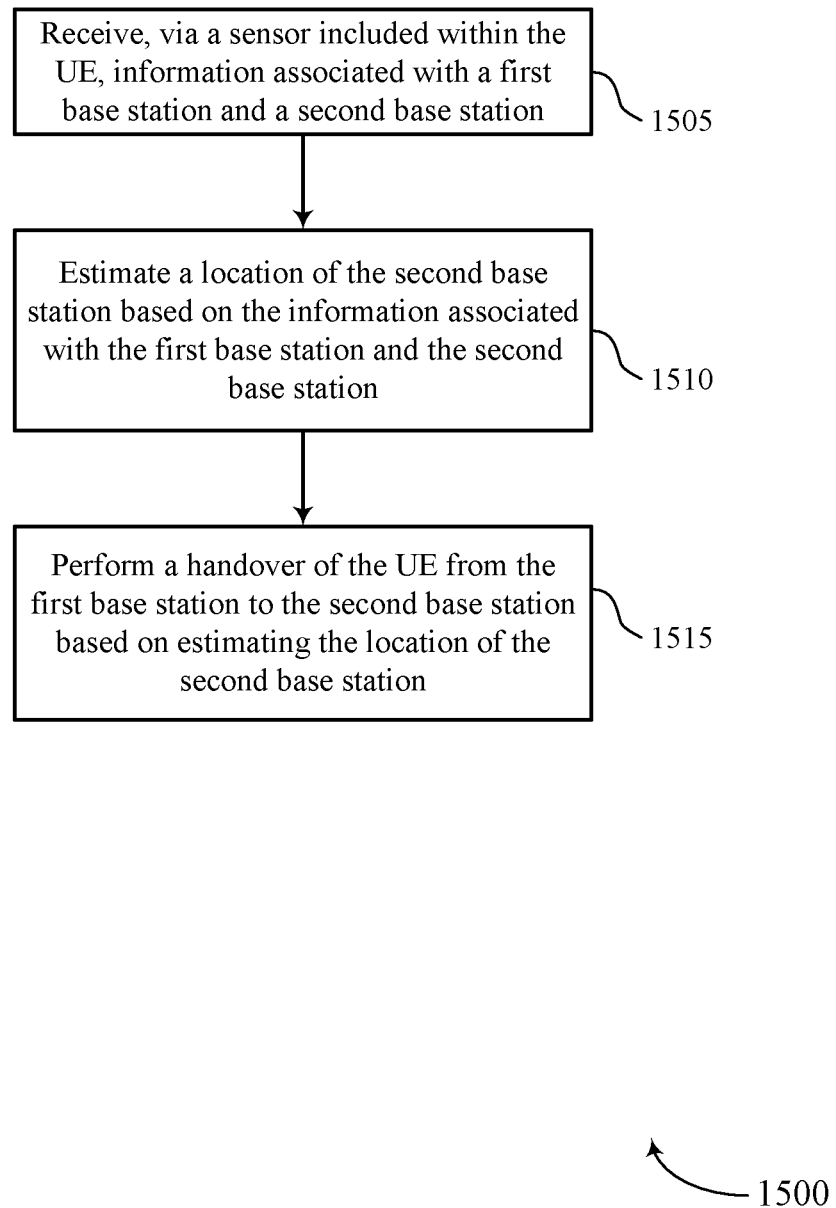

FIG. 15 shows a flowchart illustrating a method 1500 that supports techniques for using sensor information for wireless communications in accordance with one or more aspects of the present disclosure. The operations of method 1500 may be implemented by a UE 115 or its components as described herein. For example, the operations of method 1500 may be performed by a communications manager as described with reference to FIGS. 4 through 7. In some examples, a first communications device may execute a set of instructions to control the functional elements of the first communications device to perform the functions described herein. Additionally or alternatively, a first communications device may perform aspects of the functions described herein using special-purpose hardware.

At 1505, the UE may receive, via a sensor included within the UE, information associated with a first base station and a second base station. The operations of 1505 may be performed according to the methods described herein. In some examples, aspects of the operations of 1505 may be performed by a sensor information component as described with reference to FIGS. 4 through 7.

At 1510, the UE may estimate a location of the second base station based on the information associated with the first base station and the second base station. The operations of 1510 may be performed according to the methods described herein. In some examples, aspects of the operations of 1510 may be performed by a sensor information component as described with reference to FIGS. 4 through 7.

At 1515, the UE may perform a handover of the UE from the first base station to the second base station based on estimating the location of the second base station. The operations of 1515 may be performed according to the methods described herein. In some examples, aspects of the operations of 1515 may be performed by a communication component as described with reference to FIGS. 4 through 7.

Figure 16:
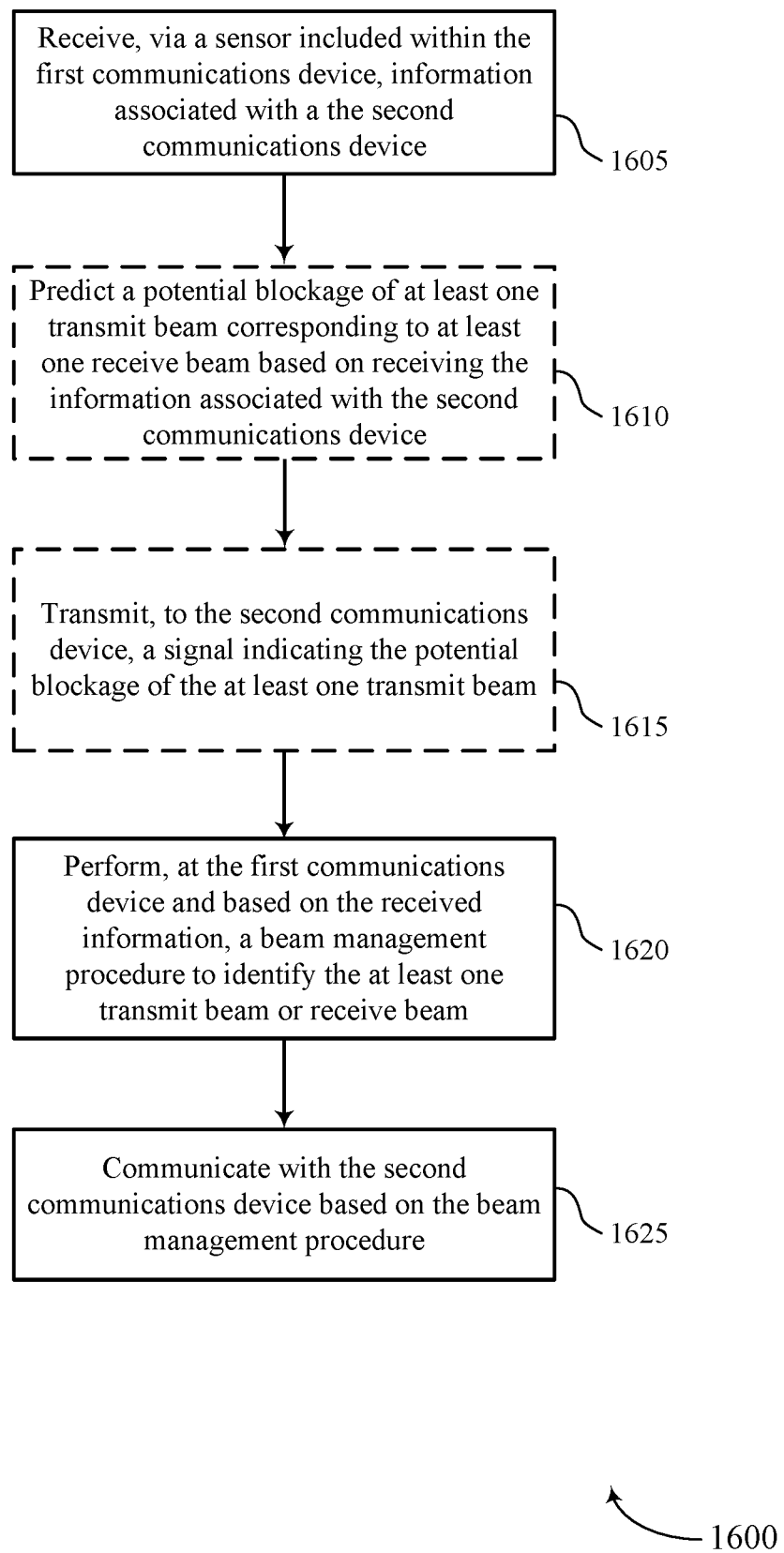

FIG. 16 shows a flowchart illustrating a method 1600 that supports techniques for using sensor information for wireless communications in accordance with one or more aspects of the present disclosure. The operations of method 1600 may be implemented by a UE 115, a base station 105 or its components as described herein. For example, the operations of method 1600 may be performed by a communications manager as described with reference to FIGS. 4 through 7 and FIGS. 8 through 11. In some examples, a first communications device may execute a set of instructions to control the functional elements of the base station to perform the functions described herein. Additionally or alternatively, a first communications device may perform aspects of the functions described herein using special-purpose hardware.

At 1605, the first communications device may receive, via a sensor included within the first communications device, information associated with a second communications device. The operations of 1605 may be performed according to the methods described herein. In some examples, aspects of the operations of 1605 may be performed by a sensor information component as described with reference to FIGS. 4 through 7 and FIGS. 8 through 11.

At 1610, the first communications device may optionally predict a potential blockage of at least one transmit beam corresponding to at least one receive beam based on receiving the information associated with the second communications device. The operations of 1610 may be performed according to the methods described herein. In some examples, aspects of the operations of 1610 may be performed by a blockage component as described with reference to FIGS. 4 through 7 and FIGS. 8 through 11.

At 1615, the first communications device may optionally transmit, to the second communications device, a signal indicating the potential blockage of the at least one transmit beam. The operations of 1615 may be performed according to the methods described herein. In some examples, aspects of the operations of 1615 may be performed by a beam management component as described with reference to FIGS. 4 through 7 and FIGS. 8 through 11.

At 1620, the first communications device may perform, at the first communications device and based on the received information, a beam management procedure to identify the at least one transmit beam or receive beam. In one example, the beam management procedure may be based on transmitting the indication. The operations of 1620 may be performed according to the methods described herein. In some examples, aspects of the operations of 1620 may be performed by a beam management component as described with reference to FIGS. 4 through 7 and FIGS. 8 through 11.

At 1625, the first communications device may communicate with the second communications device based on the beam management procedure. The operations of 1625 may be performed according to the methods described herein. In some examples, aspects of the operations of 1625 may be performed by a communication component as described with reference to FIGS. 4 through 7 and FIGS. 8 through 11.

It should be noted that the methods described herein describe possible implementations, and that the operations and the operations may be rearranged or otherwise modified and that other implementations are possible. Further, aspects from two or more of the methods may be combined.

Aspect 1: A method for wireless communication at a first communications device, comprising: receiving, via a sensor included within the first communications device, information associated with a second communications device; performing, at the first communications device and based at least in part on the received information, a beam management procedure to identify at least one transmit beam or receive beam; and communicating with the second communications device based at least in part on the beam management procedure.

Aspect 2: The method of aspect 1, further comprising: receiving, via a camera included within the first communications device, an image of the second communications device; and processing the image of the second communications device to identify an antenna panel of the second communications device, wherein the beam management procedure is based at least in part on identifying the antenna of the second communications device.

Aspect 3: The method of one or more of aspects 1 or 2, the performing comprising: predicting a potential blockage of the at least one transmit beam corresponding to the at least one receive beam based at least in part on receiving the information associated with the second communications device; and transmitting, to the second communications device, a signal indicating the potential blockage of the at least one transmit beam.

Aspect 4: The method of one or more of aspects 1 to 3, further comprising: receiving, from the second communications device, an indication to perform a beam switch procedure prior to failure of the at least one transmit beam; and performing the beam switch procedure to switch to a second transmit beam to track a second receive beam based at least in part on the received indication.

Aspect 5: The method of one or more of aspects 1 to 4, wherein the at least one transmit beam has a higher priority than the second transmit beam.

Aspect 6: The method of one or more of aspects 1 to 5, the performing comprising: determining a first reference signal receive power associated with the at least one transmit beam and a second reference signal receive power associated with a second transmit beam, wherein the first reference signal receive power is greater than the second reference signal receive power; predicting a potential blockage of the at least one transmit beam based at least in part on receiving the information associated with the second communications device; and transmitting, to the second communications device and based at least in part on predicting the potential blockage of the at least one transmit beam, a measurement report associated with the second transmit beam.

Aspect 7: The method of one or more of aspects 1 to 6, further comprising: determining that the first communications device is located on a line of sight of the second communications device based at least in part on receiving the information associated with the second communications device; and transmitting, to the second communications device, a signal indicating that the first communications device is located on the line of sight of the second communications device.

Aspect 8: The method of one or more of aspects 1 to 7, further comprising: receiving, via the sensor included within the first communications device, additional information associated with a third communications device; and performing, at the first communications device, an interference management associated with the third communications device based at least in part on receiving the information associated with the second communications device and the additional information associated with the third communications device.

Aspect 9: The method of one or more of aspects 1 to 8, further comprising: establishing an initial access of the second communications device based at least in part on receiving the information associated with the second communications device.

Aspect 10: The method of one or more of aspects 1 to 9, the receiving comprising: receiving, via a radio detection and ranging sensor included within the first communications device, a signal identifying an antenna of the second communications device, wherein the beam management procedure is based at least in part on identifying the antenna.

Aspect 11: The method of one or more of aspects 1 to 10, the receiving comprising: receiving, via a light detection and ranging sensor included within the first communications device, a signal identifying an antenna of the second communications device, wherein the beam management procedure is based at least in part on identifying the antenna.

Aspect 12: The method of one or more of aspects 1 to 11, wherein the information associated with the second communications device comprises environment information identifying an antenna panel of the second communications device.

Aspect 13: A method for wireless communication at a UE, comprising: receiving, via a sensor included within the UE, information associated with a base station; performing, at the UE, a power control procedure based at least in part on the received information; and communicating with the base station based at least in part on performing the power control procedure.

Aspect 14: The method of aspect 13, further comprising: receiving, via a camera included within the UE, an image of the base station; and processing the image of the base station to identify an antenna panel of the base station.

Aspect 15: The method of one or more of aspects 13 or 14, further comprising: determining that the UE is located on a line of sight of the base station based at least in part on receiving the information associated with the base station; and transmitting, to the base station, a signal indicating that the UE is located on the line of sight of the base station.

Aspect 16: The method of one or more of aspects 13 to 15, the performing comprising: performing, at the base station, the power control procedure based at least in part on determining that the UE is located on the line of sight of the base station.

Aspect 17: The method of one or more of aspects 13 to 16, further comprising: establishing an initial access procedure at the base station based at least in part on receiving the information associated with the base station.

Aspect 18: The method of one or more of aspects 13 to 17, the receiving comprising: receiving, via a radio detection and ranging sensor included within the UE, a signal identifying the base station, wherein the power control procedure is based at least in part on identifying the base station.

Aspect 19: The method of one or more of aspects 13 to 18, the receiving comprising: receiving, via a light detection and ranging sensor included within the UE, a signal identifying the base station, wherein the power control procedure is based at least in part on identifying the base station.

Aspect 20: The method of one or more of aspects 13 to 19, wherein the information associated with the base station comprises environment information identifying the base station.

Aspect 21: A method for wireless communication at a UE, comprising: receiving, via a sensor included within the UE, information associated with a first base station and a second base station; estimating a location of the second base station based at least in part on the information associated with the first base station and the second base station; and performing a handover of the UE from the first base station to the second base station based at least in part on estimating the location of the second base station.

Aspect 22: The method of aspect 21, the receiving comprising: receiving, via a camera included within the UE, an image including the first base station and the second base station, wherein estimating the location of the second base station is based at least in part on the image.

Aspect 23: The method of one or more of aspects 21 or 22, further comprising: communicating with the second base station based at least in part on performing the handover.

Aspect 24: The method of one or more of aspects 21 to 23, further comprising: establishing an initial access of the first base station based at least in part on receiving the information associated with the first base station and the second base station.

Aspect 25: The method of one or more of aspects 21 to 24, the receiving comprising: receiving, via a radio detection and ranging sensor included within the UE, a signal identifying the first base station and the second base station.

Aspect 26: The method of one or more of aspects 21 to 25, the receiving comprising: receiving, via a light detection and ranging sensor included within the UE, a signal identifying the first base station and the second base station.

Aspect 27: The method of one or more of aspects 21 to 26, wherein the information associated with the first base station and the second base station comprises environment information identifying the first base station and the second base station.

Aspect 28: A method for wireless communication, comprising: receiving, via a sensor included within the base station, information associated with a UE; performing, at the base station and based at least in part on the received information, a beam management procedure to track a UE beam corresponding to a base station beam; and communicating with the UE based at least in part on performing the beam management procedure.

Aspect 29: The method of aspect 28, further comprising: receiving, via a camera included within the base station, an image of the UE; and processing the image of the UE to identify the UE, wherein the beam management procedure is based at least in part on identifying the UE.

Aspect 30: The method of one or more of aspects 28 or 29, the performing comprising: predicting a potential blockage of the base station beam corresponding to the UE beam based at least in part on receiving the information associated with the UE; and transmitting, to the UE and based at least in part on predicting the potential blockage, an indication to perform a beam switch procedure to switch to a second UE beam to track a second base station beam prior to failure of the base station beam.

Aspect 31: The method of one or more of aspects 28 to 30, wherein performing the beam management procedure further comprises: receiving, from the UE, a signal indicating a potential blockage of the UE beam; and transmitting, to the UE and based at least in part on receiving the signal, an indication to perform a beam switch procedure to switch to a second UE beam to track a second base station beam prior to failure of the UE beam.

Aspect 32: The method of one or more of aspects 28 to 31, wherein the UE beam has a higher priority than the second UE beam.

Aspect 33: The method of one or more of aspects 28 to 32, the performing comprising: receiving, from the UE and based at least in part on a potential blockage of the UE beam, a measurement report associated with a second UE beam, wherein the UE is associated with a first reference signal receive power and the second UE beam is associated with a second reference signal receive power, the first reference signal receive power being greater than the second reference signal receive power.

Aspect 34: The method of one or more of aspects 28 to 33, further comprising: receiving, from the UE, a signal indicating that the UE is located on a line of sight of the base station, wherein performing the beam management procedure is based at least in part on the signal.

Aspect 35: The method of one or more of aspects 28 to 34, further comprising: establishing an initial access of the UE based at least in part on receiving the information associated with the UE.

Aspect 36: The method of one or more of aspects 28 to 35, the receiving comprising: receiving, via a radio detection and ranging sensor included within the base station, a signal identifying the UE, wherein the beam management procedure is based at least in part on identifying the UE.

Aspect 37: The method of one or more of aspects 28 to 36, the receiving comprising: receiving, via a light detection and ranging sensor included within the base station, a signal identifying the UE, wherein the beam management procedure is based at least in part on identifying the UE.

Aspect 38: The method of one or more of aspects 28 to 37, wherein the information associated with the UE comprises environment information identifying the UE.

Aspect 39: An apparatus for wireless communication comprising at least one means for performing a method of one or more of aspects 1 through 12.

Aspect 40: An apparatus for wireless communication comprising at least one means for performing a method of one or more of aspects 13 through 20.

Aspect 41: An apparatus for wireless communication comprising at least one means for performing a method of one or more of aspects 21 through 27.

Aspect 42: An apparatus for wireless communication comprising at least one means for performing a method of one or more of aspects 28 through 38.

Aspect 43: An apparatus for wireless communication, comprising: a processor; and memory coupled to the processor, the processor and memory configured to: perform a method of one or more of aspects 1 through 12.

Aspect 44: An apparatus for wireless communication, comprising: a processor; and memory coupled to the processor, the processor and memory configured to: perform a method of one or more of aspects 13 through 20.

Aspect 45: An apparatus for wireless communication, comprising: a processor; and memory coupled to the processor, the processor and memory configured to: perform a method of one or more of aspects 21 through 27.

Aspect 46: An apparatus for wireless communication, comprising: a processor; and memory coupled to the processor, the processor and memory configured to: perform a method of one or more of aspects 28 through 38.

Aspect 47: A non-transitory computer-readable medium storing code for wireless communications, the code comprising instructions executable by a processor to perform a method of one or more of aspects 1 through 12.

Aspect 48: A non-transitory computer-readable medium storing code for wireless communications, the code comprising instructions executable by a processor to perform a method of one or more of aspects 13 through 20.

Aspect 49: A non-transitory computer-readable medium storing code for wireless communications, the code comprising instructions executable by a processor to perform a method of one or more of aspects 21 through 27.

Aspect 50: A non-transitory computer-readable medium storing code for wireless communications, the code comprising instructions executable by a processor to perform a method of one or more of aspects 28 through 38.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first communications device, comprising:
   receiving, via one or more sensors of the first communications device, information associated with a second communications device, the information comprising a quantity of a plurality of antennas of the second communications device;
   performing, at the first communications device and based at least in part on a location of an antenna of the plurality of antennas included in the information, a beam management procedure to identify at least one transmit beam of the first communications device or receive beam of the second communications device;
   predicting a potential blockage of the at least one transmit beam corresponding to the at least one receive beam of the second communications device based at least in part on receiving the information associated with the second communications device and performing the beam management procedure;
   transmitting, to the second communications device, a signal indicating the potential blockage of the at least one transmit beam, the signal further indicating at least a second transmit beam of the first communications device or a second receive beam of the second communications device; and
   communicating with the second communications device based at least in part on the beam management procedure and the signal indicating the potential blockage.

2. The method of claim 1, further comprising:
   receiving, via a camera of the first communications device, an image of the second communications device; and
   processing the image of the second communications device to identify the antenna of the second communications device, wherein the beam management procedure is based at least in part on the antenna of the second communications device.

3. The method of claim 1, further comprising:
   receiving, from the second communications device, an indication to perform a beam switch procedure prior to failure of the at least one transmit beam based at least in part on the signal indicating the potential blockage; and
   performing the beam switch procedure to switch to the second transmit beam based at least in part on the indication, wherein the second transmit beam is used to track the second receive beam of the second communications device.

4. The method of claim 3, wherein the at least one transmit beam has a higher priority than the second transmit beam.

5. The method of claim 1, the performing comprising:
   determining a first reference signal receive power associated with the at least one transmit beam and a second reference signal receive power associated with the second transmit beam, wherein the first reference signal receive power is greater than the second reference signal receive power;
   predicting the potential blockage of the at least one transmit beam based at least in part on the information associated with the second communications device; and
   transmitting, to the second communications device and based at least in part on the potential blockage of the at least one transmit beam, a measurement report associated with the second transmit beam.

6. The method of claim 1, further comprising:
determining that the first communications device is located in a line of sight of the second communications device based at least in part on the information associated with the second communications device; and
transmitting, to the second communications device, an indication that the first communications device is located in the line of sight of the second communications device.

7. The method of claim 1, further comprising:
receiving, via one or more sensors of the first communications device, additional information associated with a third communications device; and
performing, at the first communications device, an interference management associated with the third communications device based at least in part on the information associated with the second communications device and the additional information associated with the third communications device.

8. The method of claim 1, further comprising:
establishing an initial access of the second communications device based at least in part on the information associated with the second communications device.

9. The method of claim 1, the receiving comprising:
receiving, via a radio detection and ranging sensor of the first communications device, an indication identifying the antenna of the second communications device, wherein the beam management procedure is based at least in part on the signal.

10. The method of claim 1, the receiving comprising:
receiving, via a light detection and ranging sensor of the first communications device, an indication identifying the antenna of the second communications device, wherein the beam management procedure is based at least in part on the signal.

11. The method of claim 1, wherein the information associated with the second communications device further comprises environment information identifying one or more objects surrounding the second communications device.

12. An apparatus for wireless communication at a first communications device, comprising:
means for receiving information associated with a second communications device, the information comprising a quantity of a plurality of antennas of the second communications device;
means for performing, at the first communications device and based at least in part on a location of an antenna of the plurality of antennas included in the information, a beam management procedure to identify at least one transmit beam of the first communications device or receive beam of the second communications device;
means for predicting a potential blockage of the at least one transmit beam corresponding to the at least one receive beam of the second communications device based at least in part on receiving the information associated with the second communications device and performing the beam management procedure;
means for transmitting, to the second communications device, a signal indicating the potential blockage of the at least one transmit beam, the signal further indicating at least a second transmit beam of the first communications device or a second receive beam of the second communications device; and
means for communicating with the second communications device based at least in part on the beam management procedure and the signal indicating the potential blockage.

13. The apparatus of claim 12, further comprising:
means for receiving an image of the second communications device; and
means for processing the image of the second communications device to identify the antenna of the second communications device, wherein the beam management procedure is based at least in part on the antenna of the second communications device.

14. The apparatus of claim 12, further comprising:
means for receiving, from the second communications device, an indication to perform a beam switch procedure prior to failure of the at least one transmit beam based at least in part on the signal indicating the potential blockage; and
means for performing the beam switch procedure to switch to the second transmit beam based at least in part on the indication, wherein the second transmit beam is used to track the second receive beam of the second communications device.

15. The apparatus of claim 14, wherein the at least one transmit beam has a higher priority than the second transmit beam.

16. The apparatus of claim 12, further comprising:
means for determining a first reference signal receive power associated with the at least one transmit beam and a second reference signal receive power associated with the second transmit beam, wherein the first reference signal receive power is greater than the second reference signal receive power;
means for predicting the potential blockage of the at least one transmit beam based at least in part on the information associated with the second communications device; and
means for transmitting, to the second communications device and based at least in part on predicting the potential blockage of the at least one transmit beam, a measurement report associated with the second transmit beam.

17. The apparatus of claim 12, further comprising:
means for determining that the first communications device is located in a line of sight of the second communications device based at least in part on the information associated with the second communications device; and
means for transmitting, to the second communications device, an indication that the first communications device is located in the line of sight of the second communications device.

18. The apparatus of claim 12, further comprising:
means for receiving additional information associated with a third communications device; and
means for performing, at the first communications device, an interference management associated with the third communications device based at least in part on the information associated with the second communications device and the additional information associated with the third communications device.

19. The apparatus of claim 12, further comprising:
means for establishing an initial access of the second communications device based at least in part on the information associated with the second communications device.

20. The apparatus of claim 12, wherein the information associated with the second communications device further comprises environment information identifying one or more objects surrounding the second communications device.

21. An apparatus for wireless communication, comprising:
one or more memories; and
one or more processors coupled with the one or more memories and individually or collectively configured to cause the apparatus to:
receive, via one or more sensors of the apparatus, information that includes a quantity of a plurality of antennas associated with a second communications device;
perform, based at least in part on a location of an antenna of the plurality of antennas included in the information, a beam management procedure to identify at least one transmit beam of the apparatus or receive beam of the second communications device;
predict a potential blockage of the at least one transmit beam that corresponds to the at least one receive beam of the second communications device based at least in part on the information associated with the second communications device and the beam management procedure;
transmit, to the second communications device, a signal that indicates the potential blockage of the at least one transmit beam, wherein the signal further indicates at least a second transmit beam of the apparatus or a second receive beam of the second communications device; and
communicate with the second communications device based at least in part on the beam management procedure and the signal that indicates the potential blockage.

22. The apparatus of claim 21, wherein the one or more processors are individually or collectively configured to cause the apparatus to:
receive, via a camera of the apparatus, an image of the second communications device; and
process the image of the second communications device to identify the antenna of the second communications device, wherein the beam management procedure is based at least in part on the antenna of the second communications device.

23. The apparatus of claim 21, wherein the the one or more processors are individually or collectively configured to cause the apparatus to:
receive, from the second communications device, an indication to perform a beam switch procedure prior to failure of the at least one transmit beam based at least in part on the signal that indicates the potential blockage; and
perform the beam switch procedure to switch to the second transmit beam based at least in part on the indication, wherein the second transmit beam is used to track the second receive beam.

24. The apparatus of claim 23, wherein the at least one transmit beam has a higher priority than the second transmit beam.

25. The apparatus of claim 21, wherein, to perform the beam management procedure, the one or more processors are individually or collectively configured to cause the apparatus to:
determine a first reference signal receive power associated with the at least one transmit beam and a second reference signal receive power associated with the second transmit beam, wherein the first reference signal receive power is greater than the second reference signal receive power;
predict the potential blockage of the at least one transmit beam based at least in part on the information associated with the second communications device; and
transmit, to the second communications device and based at least in part on prediction of the potential blockage of the at least one transmit beam, a measurement report associated with the second transmit beam.

26. The apparatus of claim 21, wherein the one or more processors are individually or collectively configured to cause the apparatus to:
determine that the apparatus is located in a line of sight of the second communications device based at least in part on the information associated with the second communications device; and
transmit, to the second communications device, an indication that the apparatus is located in the line of sight of the second communications device.

27. The apparatus of claim 21, wherein the one or more processors are individually or collectively configured to cause the apparatus to:
receive, via one or more sensors of the apparatus, additional information associated with a third communications device; and
perform an interference management associated with the third communications device based at least in part on the information associated with the second communications device and the additional information associated with the third communications device.

28. The apparatus of claim 21, wherein the one or more processors are individually or collectively configured to cause the apparatus to:
establish an initial access of the second communications device based at least in part on the information associated with the second communications device.

29. The apparatus of claim 21, wherein, to receive the information, the one or more processors are individually or collectively configured to cause the apparatus to:
receive, via a radio detection and range sensor of the apparatus, an indication that identifies the antenna of the second communications device, wherein the beam management procedure is based at least in part on the antenna.

30. The apparatus of claim 21, wherein, to receive the information, the one or more processors are individually or collectively configured to cause the apparatus to:
receive, via a light detection and ranging sensor of the apparatus, an indication that identifies the antenna of the second communications device, wherein the beam management procedure is based at least in part on the signal.

31. The apparatus of claim 21, wherein the information associated with the second communications device further comprises environment information that identifies one or more objects that surround the second communications device.

32. A non-transitory computer-readable medium storing code for wireless communication at a first communications device, the code comprising instructions executable by one or more processors to:
receive, via one or more sensors of the first communications device, information associated with a second communications device, the information comprising a quantity of a plurality of antennas of the second communications device;
perform, at the first communications device and based at least in part on a location of an antenna of the plurality of antennas included in the information, a beam management procedure to identify at least one transmit beam of the first communications device or receive beam of the second communications device;

predict a potential blockage of the at least one transmit beam that corresponds to the at least one receive beam of the second communications device based at least in part on the information associated with the second communications device and the beam management procedure;

transmit, to the second communications device, a signal that indicates the potential blockage of the at least one transmit beam, wherein the signal further indicates at least a second transmit beam of the first communications device or a second receive beam of the second communications device; and communicate with the second communications device based at least in part on the beam management procedure and the signal that indicates the potential blockage.

33. The non-transitory computer-readable medium of claim 32, wherein the instructions are further executable by the one or more processors to:
receive, via a camera of the first communications device, an image of the second communications device; and
process the image of the second communications device to identify the antenna of the second communications device, wherein the beam management procedure is based at least in part on the antenna of the second communications device.

34. The non-transitory computer-readable medium of claim 32, wherein the instructions are further executable by the one or more processors to:
receive, from the second communications device, an indication to perform a beam switch procedure prior to failure of the at least one transmit beam based at least in part on the signal indicating the potential blockage; and
perform the beam switch procedure to switch to the second transmit beam based at least in part on the indication, wherein the second transmit beam is used to track the second receive beam of the second communications device.

35. The non-transitory computer-readable medium of claim 34, wherein the at least one transmit beam has a higher priority than the second transmit beam.

36. The non-transitory computer-readable medium of claim 32, wherein the instructions are further executable by the one or more processors to:
determine a first reference signal receive power associated with the at least one transmit beam and a second reference signal receive power associated with the second transmit beam, wherein the first reference signal receive power is greater than the second reference signal receive power;
predict the potential blockage of the at least one transmit beam based at least in part on the information associated with the second communications device; and
transmit, to the second communications device and based at least in part on the potential blockage of the at least one transmit beam, a measurement report associated with the second transmit beam.

37. The non-transitory computer-readable medium of claim 32, wherein the instructions are further executable by the one or more processors to:
determine that the first communications device is located in a line of sight of the second communications device based at least in part on the information associated with the second communications device; and
transmit, to the second communications device, an indication that the first communications device is located in the line of sight of the second communications device.

38. The non-transitory computer-readable medium of claim 32, wherein the instructions are further executable by the one or more processors to:
receive, via one or more sensors of the first communications device, additional information associated with a third communications device; and
perform, at the first communications device, an interference management associated with the third communications device based at least in part on the information associated with the second communications device and the additional information associated with the third communications device.

39. The non-transitory computer-readable medium of claim 32, wherein the instructions are further executable by the one or more processors to:
establish an initial access of the second communications device based at least in part on the information associated with the second communications device.

40. The non-transitory computer-readable medium of claim 32, wherein the instructions are further executable by the one or more processors to:
receive, via a radio detection and ranging sensor of the first communications device, an indication identifying the antenna of the second communications device, wherein the beam management procedure is based at least in part on the signal.

41. The non-transitory computer-readable medium of claim 32, wherein the instructions are further executable by the one or more processors to:
receive, via a light detection and ranging sensor of the first communications device, an indication identifying the antenna of the second communications device, wherein the beam management procedure is based at least in part on the signal.

42. The non-transitory computer-readable medium of claim 32, wherein the information associated with the second communications device further comprises environment information identifying one or more objects surrounding the second communications device.

* * * * *